(12) United States Patent
Balassanian et al.

(10) Patent No.: US 7,730,211 B2
(45) Date of Patent: Jun. 1, 2010

(54) METHOD AND SYSTEM FOR GENERATING A MAPPING BETWEEN TYPES OF DATA

(75) Inventors: Edward Balassanian, Kirkland, WA (US); David S. Wolf, Redmond, WA (US)

(73) Assignee: Implicit Networks, Inc., Kirkland, WA (US)

( * ) Notice: Subject to any disclaimer, the term of this patent is extended or adjusted under 35 U.S.C. 154(b) by 0 days.

(21) Appl. No.: 11/933,093

(22) Filed: Oct. 31, 2007

(65) Prior Publication Data

US 2008/0250045 A1     Oct. 9, 2008

Related U.S. Application Data

(63) Continuation of application No. 09/304,973, filed on May 4, 1999, now abandoned.

(60) Provisional application No. 60/084,314, filed on May 5, 1998, provisional application No. 60/084,350, filed on May 5, 1998.

(51) Int. Cl.
G06F 15/16     (2006.01)

(52) U.S. Cl. .................................... 709/246; 709/247

(58) Field of Classification Search .......... 709/246–247
See application file for complete search history.

(56) References Cited

U.S. PATENT DOCUMENTS 5,627,997 A * 5/1997 Pearson et al. ................ 710/65
5,848,415 A * 12/1998 Guck ........................... 707/10
6,101,320 A * 8/2000 Schuetze et al. ............ 709/206

OTHER PUBLICATIONS

David Mosberger, Scout: A Path-Based Operating System, Doctoral Dissertation Submitted to the University of Arizona, 1997, Appendix "D".

\* cited by examiner

*Primary Examiner*—Larry Donaghue
(74) *Attorney, Agent, or Firm*—Gard & Kaslow LLP

(57) ABSTRACT

A method and system for routing data of an source type to a target type is provided. The system has various routines for converting data in one type into data in another type. In one embodiment, the system receives an indication of a source type and identifies various sequences of routines that can convert the data from the source type to a target type. The system then coordinates the processing of the data by each routines in the sequences to the conversion of the data to the target type. The process of identifying the routines is referred to as "discovery." The system also provides an aliasing mechanism by which compatible types can be identified. When identifying a sequence of routines, the system may check for routines that support compatible types. When a sequence of routines is identified, the system caches the identity of the sequence to facilitate identifying that sequence when the data of the source type is to be converted to the target type. The system also uses a mechanism for discovering sequences of routines from other computer systems. These other computer systems may broadcast various sequences of routines which are stored at the receiving computer system. A user may use a switchboard mechanism to direct data of a certain source type to one of the broadcasted sequences. This directing of the data to a certain source effects the routing of the data from one computer system to a device or routine on another computer system.

18 Claims, 24 Drawing Sheets

METHOD AND SYSTEM FOR GENERATING A MAPPING BETWEEN TYPES OF DATA

PRIORITY CLAIM

This application is a continuation of U.S. application Ser. No. 09/304,973 filed May 4, 1999 now abandoned which claims the benefit of Provisional Application 60/084,314 filed on May 5, 1998 and Provisional Application 60/084,350 filed on May 5, 1998.

TECHNICAL FIELD

The present invention relates generally to a computer system for converting data of one type to another type.

BACKGROUND

The following application is incorporated by reference as if fully set forth herein: U.S. application Ser. No. 09/304,973 filed May 4, 1999.

Computer systems, which are becoming increasingly pervasive, generate data in a wide variety of formats. The Internet is in example of interconnected computer systems that generate data in many different formats. Indeed, when data is generated on one computer system and is transmitted to another computer system to be displayed, the data may be converted in many different intermediate formats before it is eventually displayed. For example, the generating computer system may initially store the data in a bitmap format. To send the data to another computer system, the computer system may first compress the bitmap data and then encrypt the compressed data. The computer system may then convert that compressed data into a TCP format and then into an IP format. The IP formatted data may be converted into a transmission format, such as an ethernet format. The data in the transmission format is then sent to a receiving computer system. The receiving computer system would need to perform each of these conversions in reverse order to convert the data in the bitmap format. In addition, the receiving computer system may need to convert the bitmap data into a format that is appropriate for rendering on output device.

In order to process data in such a wide variety of formats, both sending and receiving computer systems need to have many conversion routines available to support the various formats. These computer systems typically use predefined configuration information to load the correct combination of conversion routines for processing data. These computer systems also use a process-oriented approach when processing data with these conversion routines. When using a process-oriented approach, a computer system may create a separate process for each conversion that needs to take place. A computer system in certain situations, however, can be expected to receive data and to provide data in many different formats that may not be known until the data is received. The overhead of statically providing each possible series of conversion routines is very high. For example, a computer system that serves as a central controller for data received within a home would be expected to process data received via telephone lines, cable TV lines, and satellite connections in many different formats. The central controller would be expected to output the data to computer displays, television displays, entertainment centers, speakers, recording devices, and so on in many different formats. Moreover, since the various conversion routines may be developed by different organizations, it may not be easy to identify that the output format of one conversion routine is compatible with the input format of another conversion routine.

It would be desirable to have a technique for dynamically identifying a series of conversion routines for processing data. In addition, it would be desirable to have a technique in which the output format of one conversion routine can be identified as being compatible with the input format of another conversion routine.

SUMMARY

A method and system for routing data of an source type to a target type is provided. The system has various routines for converting data in one type into data in another type. In one embodiment, the system receives an indication of a source type and identifies various sequences of routines that can convert the data from the source type to a target type. The system then coordinates the processing of the data by each routine in the sequences to the conversion of the data to the target type. The process of identifying the routines is referred to as "discovery." The system also provides an aliasing mechanism by which compatible types can be identified. When identifying a sequence of routines, the system may check for routines that support compatible types. When a sequence of routines is identified, the system caches the identity of the sequence to facilitate identifying that sequence when the data of the source type is to be converted to the target type. The system also uses a mechanism for discovering sequences of routines from other computer systems. These other computer systems may broadcast various sequences of routines which are stored at the receiving computer system. A user may use a switchboard mechanism to direct data of a certain source type to one of the broadcasted sequences. This directing of the data to a certain source effects the routing of the data from one computer system to a device or routine on another computer system.

DETAILED DESCRIPTION

Figure 1:
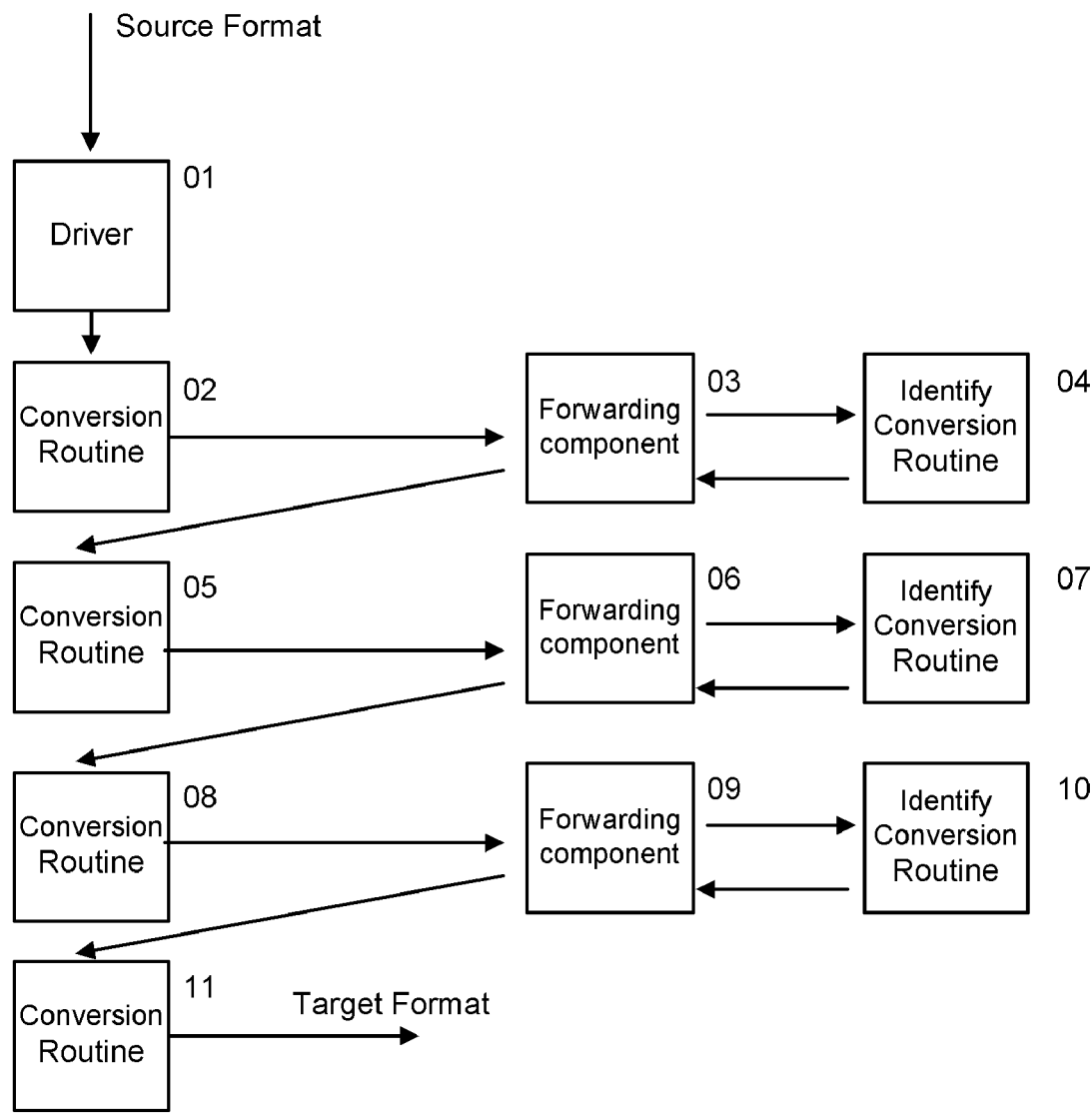
FIG. 1 is a block diagram illustrating the processing of the conversion system of the present invention.

A method and system for mapping data in one format to data in another format is provided. The system in one embodiment provides (1) a conversion system for dynamically identifying a sequence of routines for converting data in a source format into data in a target format and (2) a switchboard component for specifying a sequence of conversion routines for converting data in a source format into a target format and for routing the data. The system routes data through the sequence of routines to effect the conversion of the data to the target format or to effect the routing of the data to a target (e.g., display device or disk). The switchboard component allows a user to direct data in a certain source format to a target using a caching mechanism of the conversion system. When a user indicates to route data in that source format to the target, the system stores in a cache an indication of a sequence of routines that are to be invoked to effect the routing. When the conversion system processes data in that format, it retrieves the indication of sequences of routines from the cache and then invokes each routine to effect the routing of the data. To facilitate the use of independently developed conversion routine, the conversion system uses an aliasing scheme for naming data formats. The conversion system allows data formats to be specified as compatible with one another. In this way, even though different naming conventions may be used by different developers of the conversion routines, the conversion system will know what data formats are compatible.

The conversion system inputs data in the source format and identifies a series of conversion routines that can be used to convert the data to the target format. The conversion system dynamically identifies the conversion routines when data in the source format is received. A driver (e.g., an ethernet driver) that receives the data in the source format identifies the first conversion routine and then invokes that first conversion routine passing the data in the source format. The conversion routine converts the data into an output format and notifies a forwarding component of the conversion system. The forwarding component may either know of the target format by having prior knowledge or by receiving notification from the conversion routine, or, alternatively the forwarding component may not know of the target format. If the forwarding component knows of the target format, it can identify a sequence of one or more conversion routines that input data in the output format and that output data in the target format. The conversion system may identify more than one sequence of conversion routines that convert the data to the target format. If the forwarding system does not know the target format, it incrementally identifies the conversion routines in a sequence. Each identified conversion routine when invoked may notify the forwarding component of a target format. The forwarding component may identify multiple conversion routines for converting the data from the output format into another format. Regardless of whether the forwarding component identifies only the next conversion routine in the sequence or identifies all or several of the conversion routines in the sequence, the forwarding component invokes the next conversion routine in the sequence passing the converted data. Each conversion routine converts the data from the output format to another format and then notifies the forwarding component. This process of identifying conversion routines and notifying the forwarding component continues until the data is in the target format or no more conversion routines are available to process the data.

FIG. 1 is a block diagram illustrating the processing of the conversion system of the present invention. Data in the source format is received by driver 101. The driver may convert the data to an intermediate format or perform other processing on the data before invoking conversion routine 102. The conversion routine 102 converts the data to another intermediate format and provides that data to the forwarding component 103. The forwarding component invokes an identify conversion routine component 104 to identify a conversion routine for processing the data in the intermediate format. The identify conversion routine component may identify multiple conversion routines that input data in the intermediate format and if a target format is known may identify one or more sequences of conversion routines. The forwarding component then invokes the identified conversion routines 105 that input data in the intermediate format. Although not illustrated in this figure, a graph of the invocation of conversion routines is a tree-like structure because the forwarding component may invoke multiple conversion routines to process a certain intermediate format. This process is repeated until eventually conversion routine 111 outputs the data in a target format.

Figure 2:
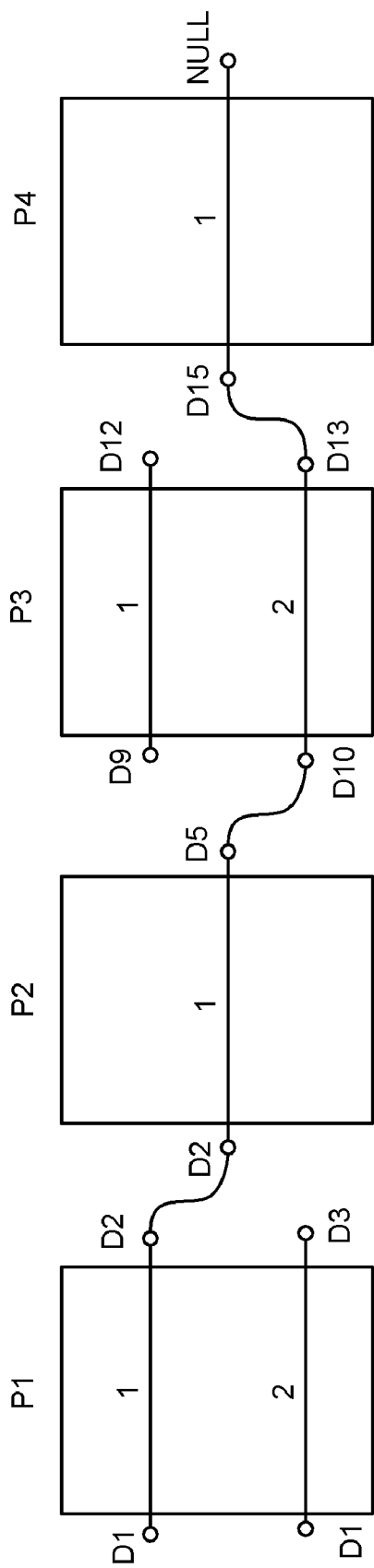
FIG. 2 is a block diagram illustrating a path.

The conversion system identifies a sequence of "edges" for converting data in one format into another format. Each edge corresponds to a conversion routine for converting data from one format to another. Each edge is part of a "protocol" that may include multiple related edges. For example, a protocol may have edges that each convert data in one format into several different formats. Each edge has an input format and an output format. A "path" is a sequence of edges such that the output format of each edge is compatible with the input format of another edge in the sequence, except for the input format of the first edge in the sequence and the output format of the last edge in the sequence. FIG. 2 is a block diagram illustrating a path. Protocol P1 includes an edge for converting format D1 to format D2 and an edge for converting format D1 to format D3; protocol P2 includes an edge for converting format D2 to format D5, and so on. A path for converting format D1 to format D15 is shown by the curved lines and is defined by the address "P1:1, P2:1, P3:2, P4:7." When a packet of data in format D1 is processed by this path, it is converted to format D15. During the process, the packet of data is sequentially converted to format D2, D5, and D13. The output format of protocol P2, edge 1 (i.e., P2:1) is format D5, but the input format of P3:2 is format D10. The conversion system uses an aliasing mechanism by which two formats, such as D5 and D10 are identified as being compatible. The use of aliasing allows different names of the same format or compatible formats to be correlated. In the following, the term "format" is also referred to as a "data type" or "media type."

The conversion system may be implemented as a media mapping system that dynamically identifies paths for converting data of one media type to another media type. The media mapping system employs an aliasing scheme that allows different protocols to use different names to refer to the same or compatible media type. For example, a protocol for processing data in the Internet Protocol ("IP") may output data of media type "IP0x04," and protocol for processing data in the Transmission Control Protocol ("TCP") may input data of media type "TCP." An administrator of the media mapping system may specify that the "IP0x04" media type is compatible with the "TCP" media type. Thus, the protocol with an edge that inputs the "TCP" media type can process data in the "IP0x04" media type. When the media mapping system receives a source media type and a target media type, it attempts to identify a path for converting the source media type to the target media type.

The media mapping system initially identifies a path by searching for a protocol with an edge whose input media type is compatible with the source media type. The media mapping system then searches for a protocol with an edge whose input media type is compatible with the output media type of the last found protocol. This process is repeated until a protocol is found with an edge that outputs the target media type. This sequence of edges of protocols forms a path. The media mapping system caches the address of the path so that the next time data is to be converted from that source media type to that target media type the path can be quickly identified from the information in the cache without searching for protocols. The media mapping system may also use cached address of paths to convert and route the data based on paths that are pre-configured or that are specified by a user using the switchboard component.

Figure 3:
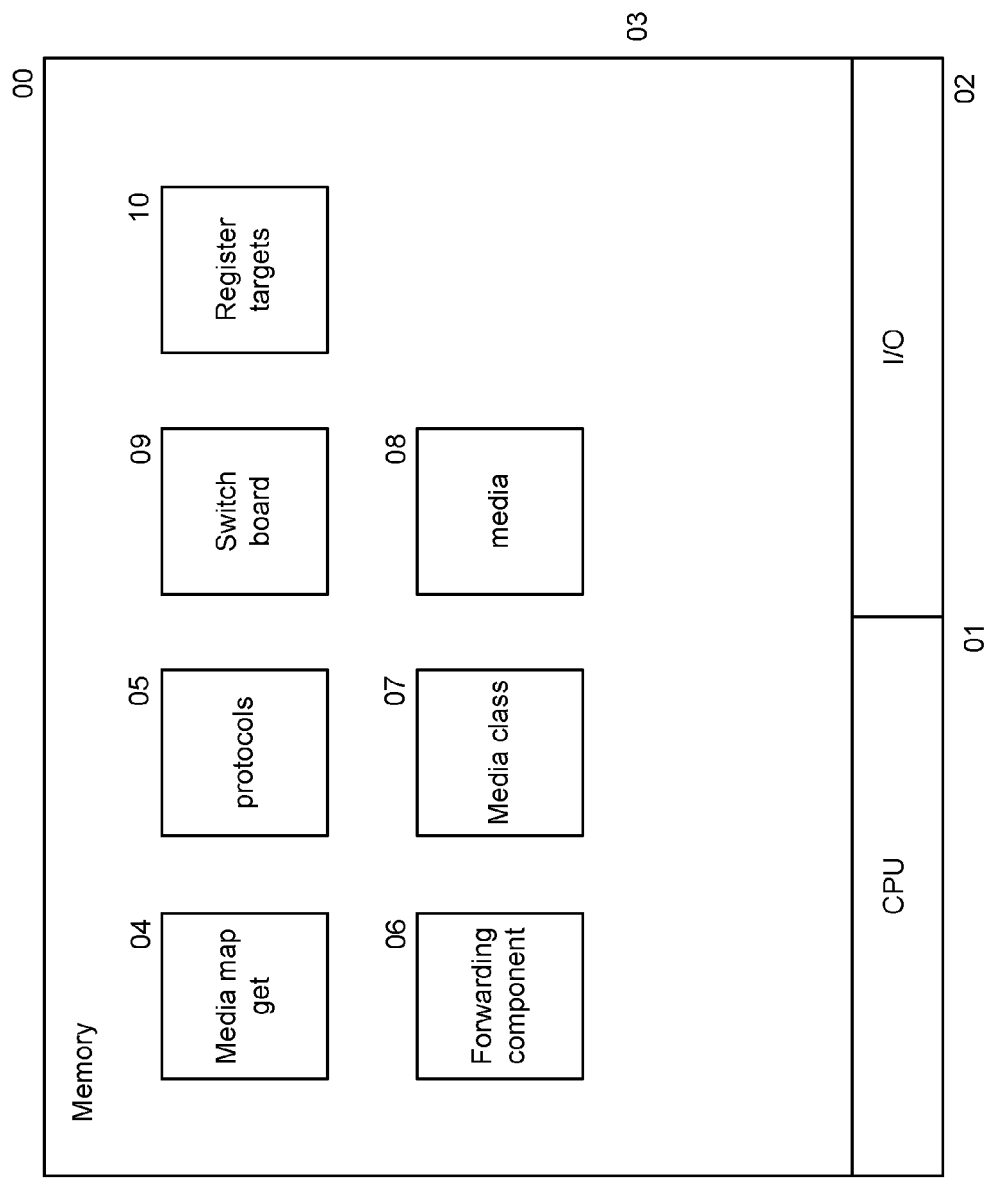
FIG. 3 is a block diagram illustrating components of the conversion system.

FIG. 3 is a block diagram illustrating components of the media mapping system. The conversion system can operate on a computer system with a central processing unit 301, I/O devices 302, and memory 303. The media mapping system includes a media map get component 304 that identifies conversion routines, conversion routines referred to as protocols 305, a forwarding component 306, media class data 307, media data 308, switchboard component 309, and a register target component 310. The media class data and media data are described below. The switchboard component is used to route data of a certain media type to a certain target device. The register target component is used to register the possible target devices for the data. The process of identifying a path either by searching for routines, by receiving a path from another computer, or by another means is referred to as "discovering the path." The media mapping system may be stored as instructions on a computer-readable medium, such as a disk drive or memory. The data structures of the media mapping system may also be stored on a computer-readable medium. The I/O devices may include an Internet connection, a connection to various output devices such as a television, and a connection to various input devices such as a television receiver.

The conversion system may be used in conjunction with a routing system to route data generated in one format to a certain device. For example, data generated by a program in bitmap format on one computer system may be routed to the display of another computer. The routing system may provide a switchboard component through which a user can route data in one format to a certain target (e.g., device or program). As explained below in more detail, the switchboard component provides a list of source formats that can be generated by or received at the computer system and a list of the possible targets. A user can use the switchboard component to specify that data in a certain source format is to be routed to a certain target or multiple targets. The routing system then sets up the appropriate data structures to ensure that data is routed to the target. In one embodiment, the routing system uses the address of a path to identify the routines that effect the routing of the data. The routing system stores the address in a cache of the conversion system so that the conversion system can route the data of the form based on the path.

Figure 4:
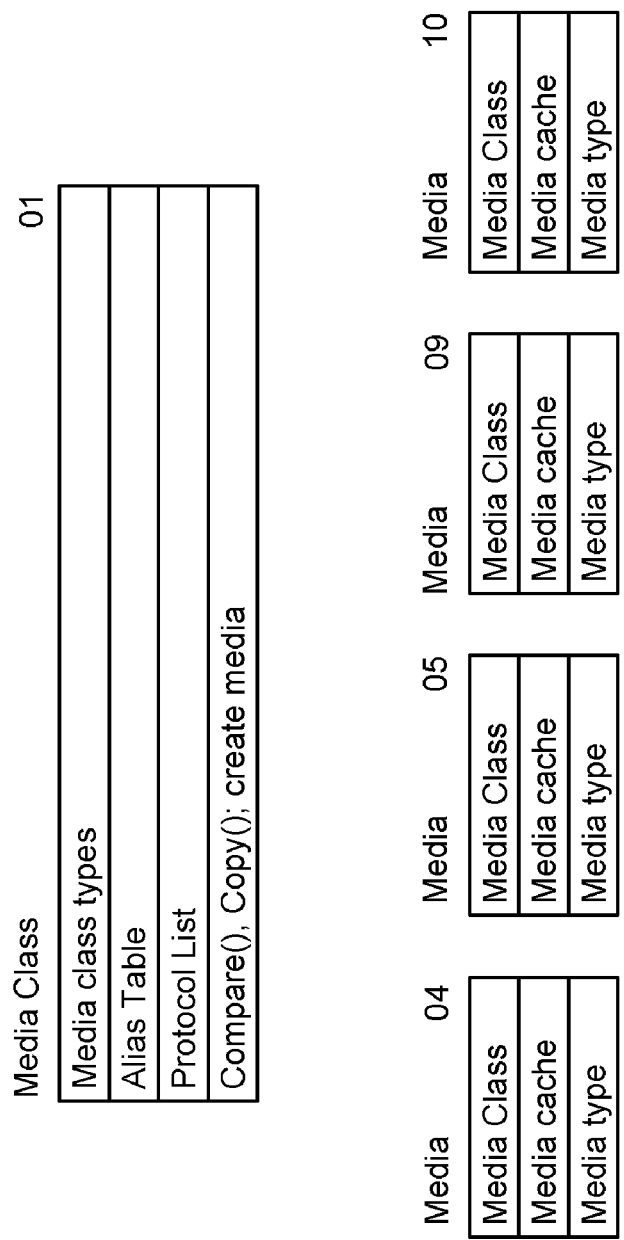
FIG. 4 is a block diagram illustrating the organization of a media class and medias.
Figure 5:
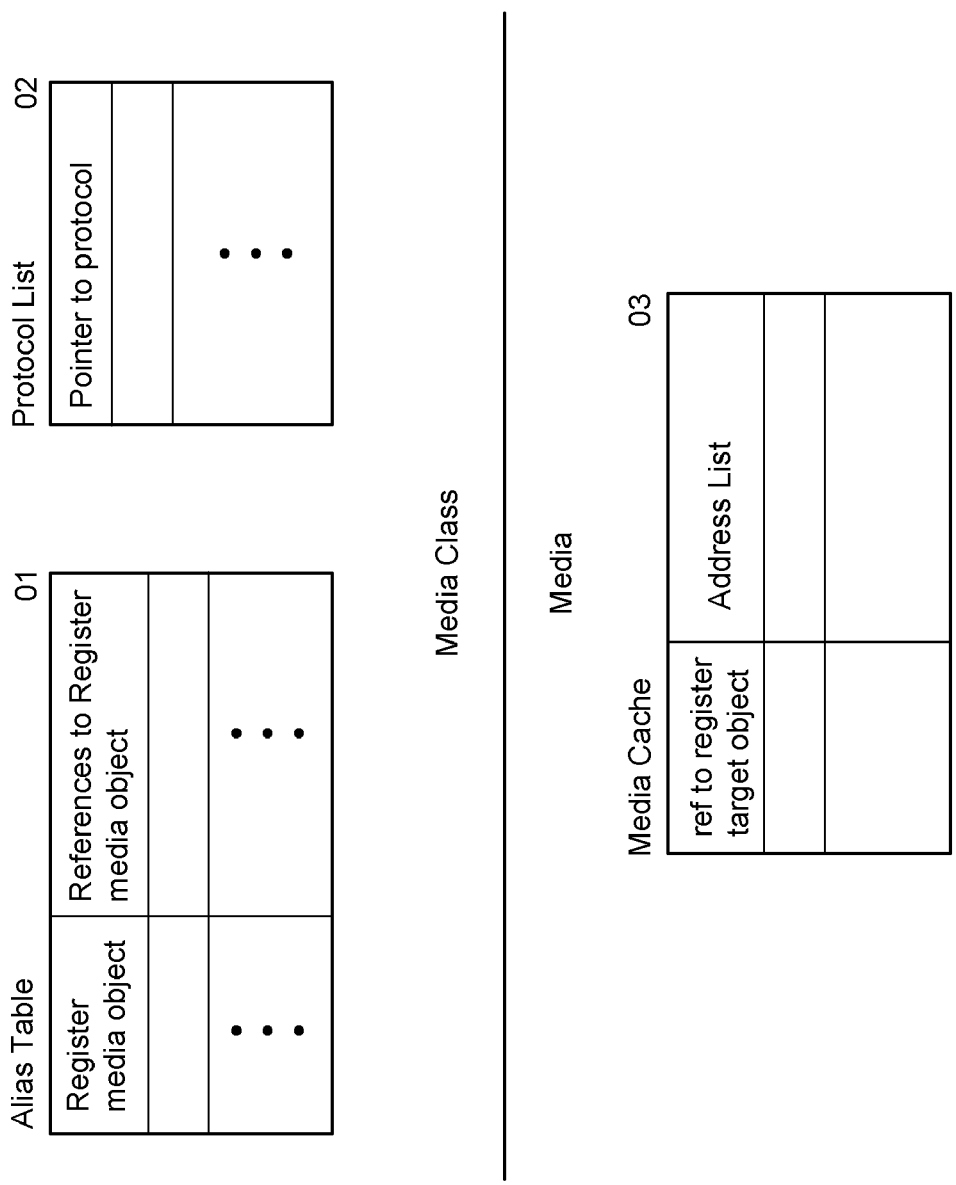
FIG. 5 is a block diagram illustrating data structures within a media class and a media.
Figure 6:
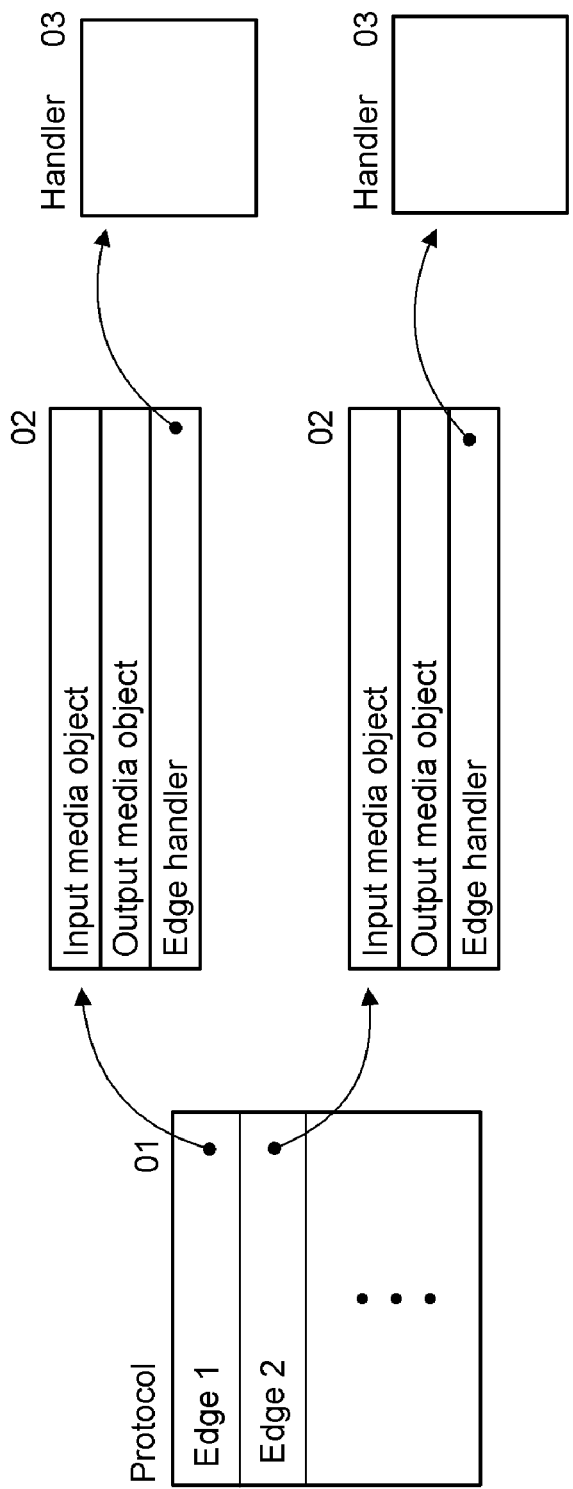
FIG. 6 is a block diagram of a protocol object.

FIGS. 4-6 are block diagrams illustrating data structures used by the media mapping system. FIG. 4 is a block diagram illustrating the organization of a media class and medias. Each media class 401 is an object that contains a media class type, an alias table, a protocol list, and references to various functions supported by the media class. Each media class has associated medias 402-405. Each media is an object that contains a reference to its media class, a media cache, and a media type.

FIG. 5 is a block diagram illustrating data structures within a media class and a media. A media class contains an alias table 501 and a protocol list 502. The alias table contains an alias entry for each media type within the media class for which an alias has been registered. Each alias entry contains a registered media for the media type. The protocol list contains a protocol entry for each protocol with an edge that inputs a media type within the media class. A protocol entry contains a reference to a protocol object for that protocol. A media contains a media cache 503. The media mapping system uses the media caches to cache the addresses of paths from the media type of the media to a target media type. Each cache entry contains a reference to a registered target media and addresses of paths from that media type to the target media type that have already been identified.

The conversion system uses the caches of the various media so that paths can be efficiently identified and so that data can be routed in accordance with static routing information and with dynamic routing information that may be specified by a user. When identifying a path for processing data in a certain output format, the conversion system first checks the cache of a media that specifies the media type of the data to be converted. If the cache contains an entry for the target media type, then the conversion system retrieves that entry and converts the data in accordance with the paths identified by the addresses in that entry. If the cache of that media has no entry for the target media type, the conversion system checks the cache for the registered media in the alias table entry for that media type. If the alias table contains such a registered media with an entry for the target media type, then the conversion system converts the data in accordance with the paths whose addresses are stored in that entry. The conversion system uses the caches of the media to identify paths that are dynamically identified and the registered media to identify paths that may be statically identified and that may be identified using the switchboard component.

FIG. 6 is a block diagram of a protocol object. A protocol object contains a list of edges 601 supported by that protocol. Each entry in the list contains a pointer to an edge object 602. An edge object contains an input media for the input media type of the edge and an output media for the output media type of the edge and a pointer to a handler for the edge.

Figure 7:
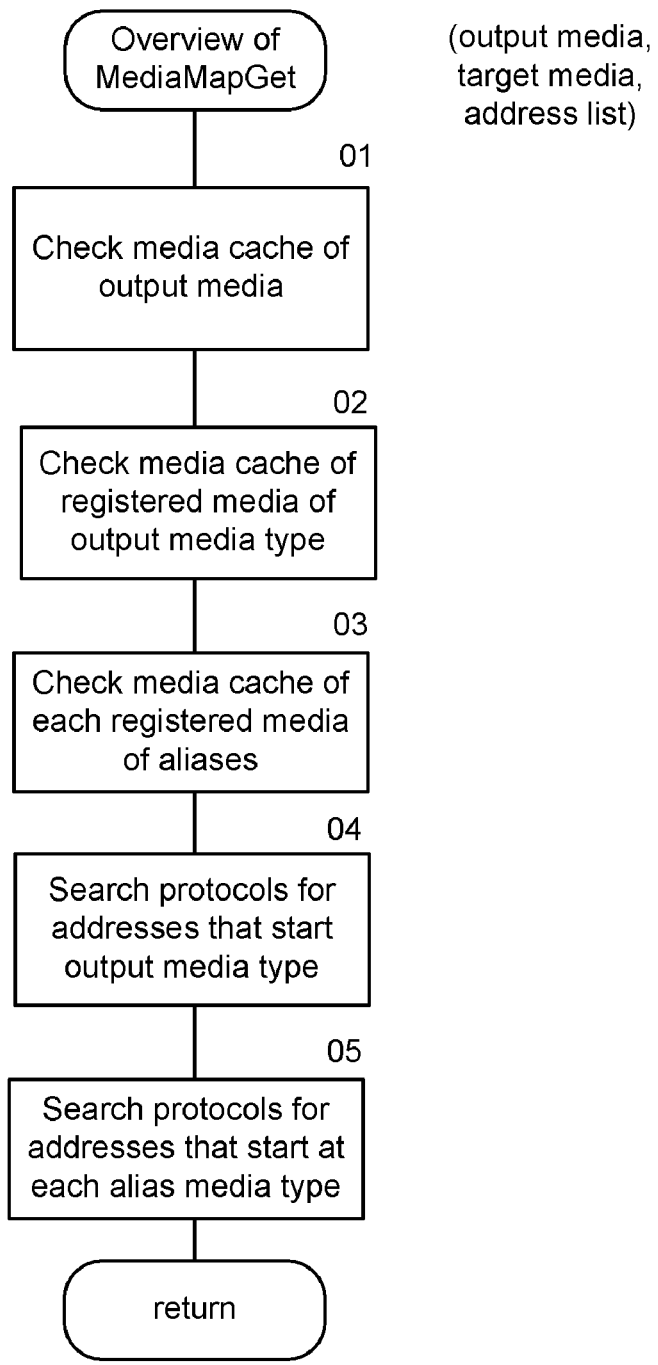
FIG. 7 is a flow diagram of overview of a Media_Map_Get routine.

FIG. 7 is a flow diagram of overview of a Media_Map_Get routine. This routine is passed an output media with an output media type and a target media with a target media type and returns addresses of paths that map the output media type to the target media type in the address list. In step 701, the routine checks the media cache of the output media to determine whether the address of a path from the output media type to the target media has already been cached. If such an address has been cached, the routine returns at that point with the addresses of those paths. In step 702, the routine checks the media cache of the registered media for the output media type to determine whether the address of such a path has already been cached. The registered media for a media type is stored in an entry of the alias table for the media class of that media type. If such an address has been cached, then the routine returns at that point with the addresses of those paths. In step 703, the routine checks the media cache of each registered media that is an alias of the output media type to determine whether the cache contains any such paths. If such an address has been cached, then the routine returns at that point with the addresses. In step 704, the routine searches the protocols to identify paths for mapping the output media type to the target media type. If any such addresses are found, then the routine returns at that point with the addresses of those paths. In step 705, the routine searches the protocols to identify paths that map aliases of the output media type to the target media type. The routine then returns with the addresses of any such paths.

Figure 8:
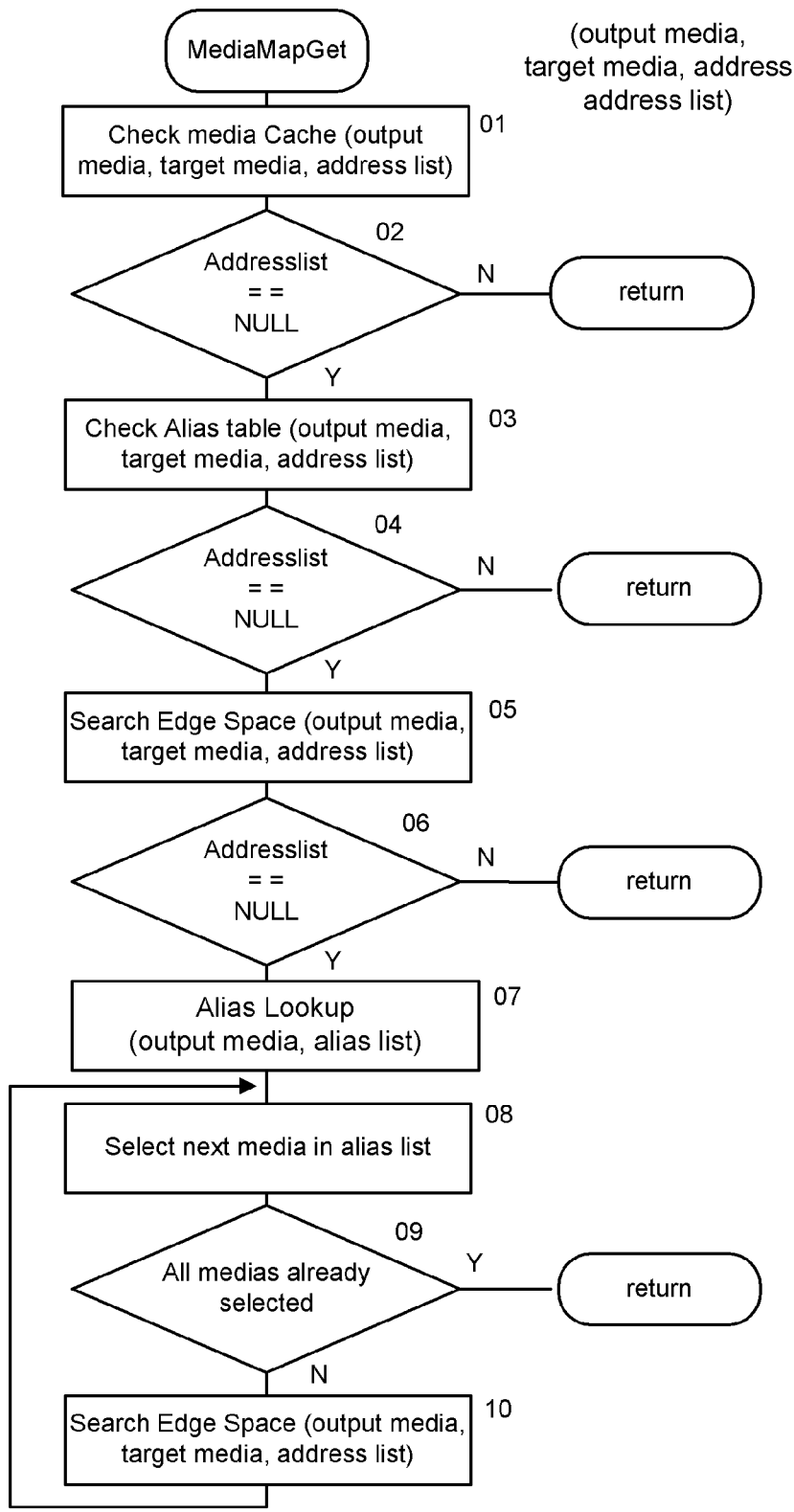
FIG. 8 is a flow diagram of an example implementation of a Media_Map_Get routine.

FIG. 8 is a flow diagram of an example implementation of a Media_Map_Get routine. This routine is passed an output media, target media, address, and address list. The routine identifies paths of protocol edges that can be used to map the output media type of the output media to the target media type of the target media. The routine returns the addresses of these paths in the address list. The routine first checks whether the addresses of any such paths have been cached, and if so, returns with those addresses. If not, the routine searches the protocols to identify paths from the output media type to the target media type. If the routine identifies any such paths, then it returns the addresses of those paths in the address list. If the routine finds no paths from the output media type to the target media type, the routine searches the protocols to identify paths from an alias media type of the output media type to the target media type. The routine returns the addresses of any such paths in the address list. This routine is recursively invoked to perform a depth-first search of the protocols for the paths. When an edge is found with an input media type that maps to the output media type, this routine is recursively invoked to find paths from the output media type of the edge. When the addresses are returned from this recursive invocation, the routine adds the edge to the beginning of those returned addresses to extend the paths. The routine uses the passed address parameter to detect loops in the paths. Prior to returning, the routine caches the paths in the output media so that the paths can be quickly identified when that output media is next passed to this routine. In step 801, the routine invokes the Check_Media_Cache routine passing the output media, the target media, and the address list. The Check_Media_Cache routine checks if an address of a path from the output media type to the target media type has been cached in the media cache of the output media. If so, the routine returns any such addresses in the address list. In step 802, if the returned address list is null, then the routine continues at step 803, else the routine returns. In step 803, the routine invokes the Check_Alias_Table routine passing the output media, the target media, and the address list. The Check_Alias_Table routine determines whether paths from the output media type or an alias media type to the target media type have been cached in the registered media of the output media type or in any registered alias media of the alias output media type. If so, the routine returns the addresses of any such returned paths. In step 804, if the returned address list is null, then the routine continues at step 805, else the routine returns. In step 805, the routine invokes the Search_Edge_Space routine passing the output media, the target media, the address, and the address list. The Search_Edge_Space routine searches protocol edges for paths from the output media type to the target media type. In step 806, if the returned address list is null, then the routine continues at step 807, else the routine returns. In steps 807-810, the routine loops selecting each alias media type of the output media type and searching protocol edges for paths from the selected alias media type to the target media type. In step 807, the routine invokes the Alias_Lookup routine passing the output media. The Alias_Lookup routine returns the list of alias medias. In step 808, the routine selects the next alias media in the returned alias list. In step 809, if all the alias medias in the alias list have already been selected, then the routine returns, else the routine continues at step 810. In step 810, the routine invokes the Search_Edge_Space routine passing the selected alias media, the target media, the address, and the address list. The routine then loops to step 808 to select the next alias media.

Figure 9:
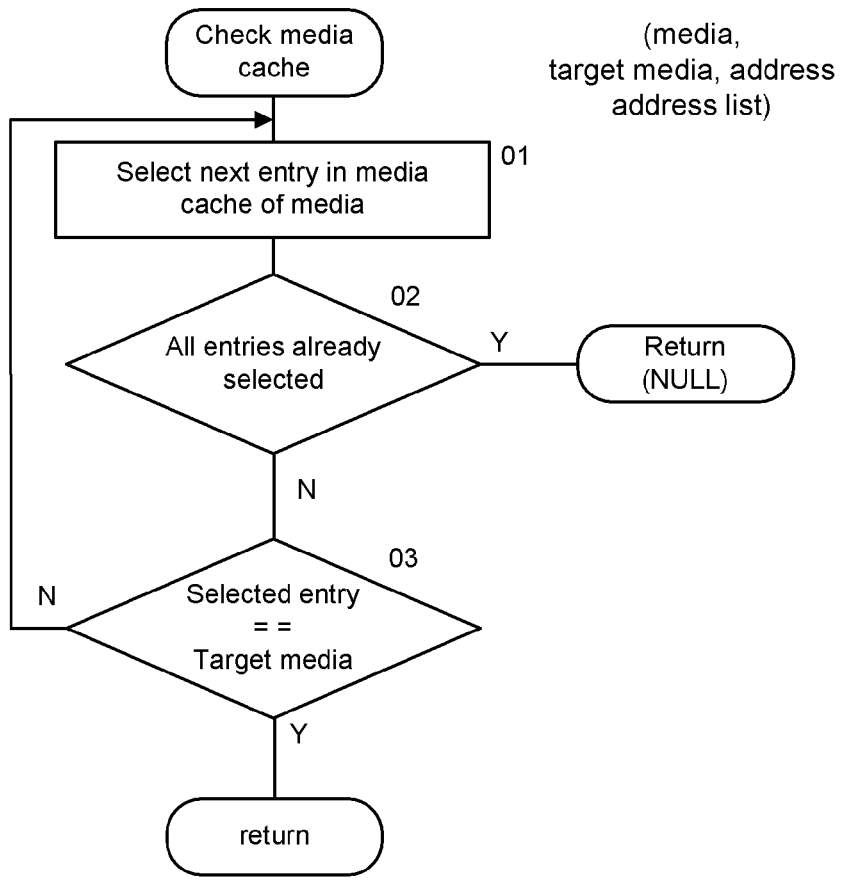
FIG. 9 is a flow diagram of an example implementation of a Check_Media_Cache routine.

FIG. 9 is a flow diagram of an example implementation of a Check_Media_Cache routine. This routine is passed a media, a target media, and an address list. This routine checks the media cache for the passed media for an entry that matches the target media. If such an entry is found, the routine returns the addresses in the entry in the address list. In step 901, the routine selects the next entry, starting with the first, in the media cache of the passed media. In step 902, if all the entries in the media cache have already been selected, then the routine returns, else the routine continues that step 903. In step 903, if the target media type of the selected entry equals the passed target media type, then the routine returns the addresses of the entry in the address list, else the routine loops to step 901 to select the next entry in the media cache of the passed media.

Figure 10:
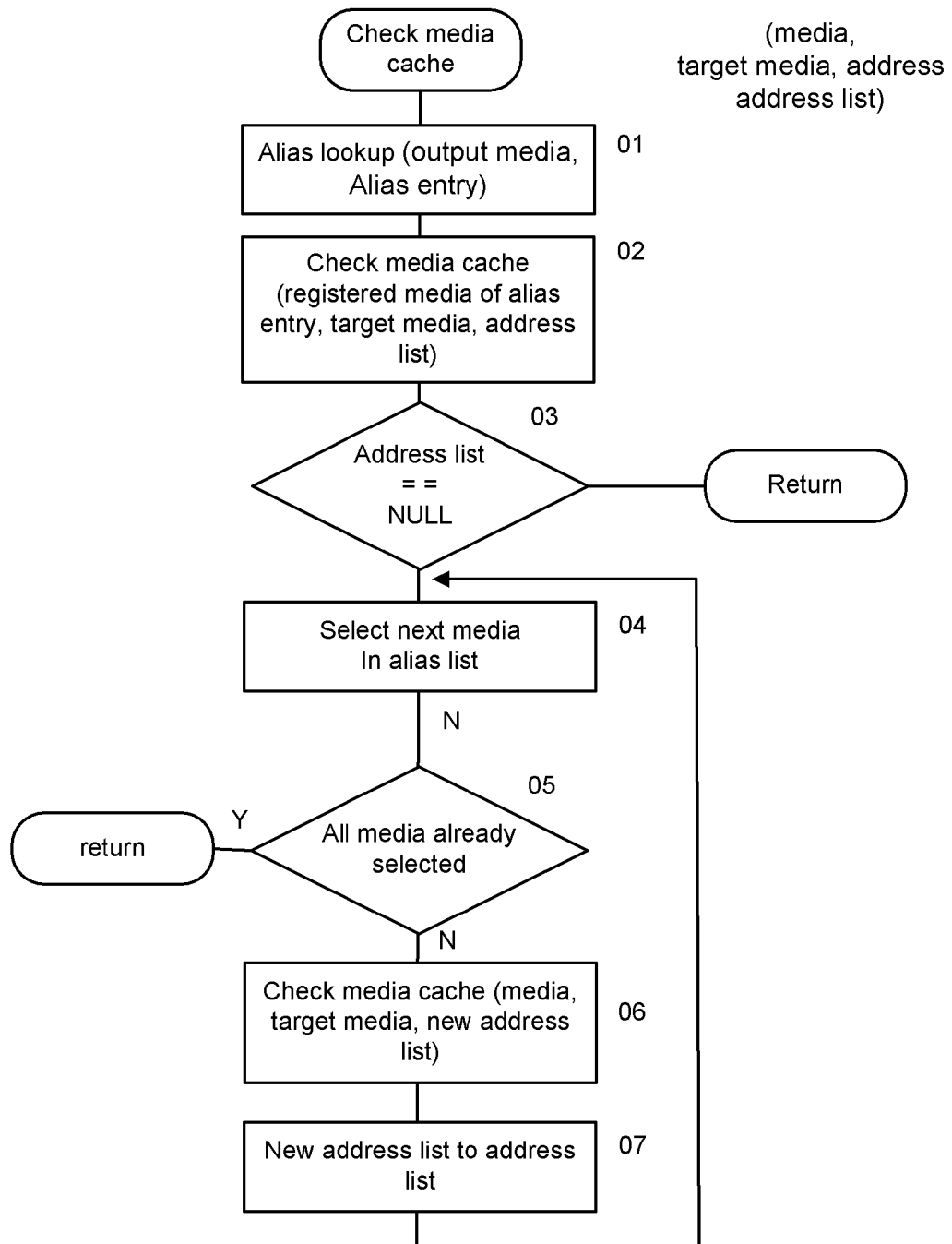
FIG. 10 is a flow diagram of an example implementation of a Check_Alias_Table routine.

FIG. 10 is a flow diagram of an example implementation of a Check_Alias_Table routine. This routine is passed an output media, target media, and address list. The routine first checks whether an address of a path from the output media type to the target media type has been cached in the registered media of the output media type in the alias table. If no such address is cached, this routine checks the media cache of each alias media of the output media type in the alias table to determine whether an address of a path from the alias media type to the target media type has been cached. In step 1001, the routine invokes the Alias_Lookup routine passing the output media and receiving the alias entry of the alias table corresponding to the output media type. In step 1002, the routine invokes the Check_Media_Cache routine passing the registered media of the alias entry, the target media, and the address list. In step 1003, if the returned address list is null, then the routine continues that step 1004, else the routine returns. In steps 1004-1007, the routine loops selecting each reference to an alias media in the alias list of the alias entry and checking whether any addresses of paths to the target media type have been cached. In step 1004, the routine selects the next reference to an alias media in the alias list. In step 1005, if all the references to alias media in the alias list have already been selected, then the routine returns, else the routine continues that step 1006. In step 1007, the routine invokes the Check_Media_Cache routine passing the referenced alias media, the target media, and a new address list. In step 1007, the routine adds the addresses in the new address list onto the passed address list so that the returned address list will include the cached addresses for all alias media types. The routine then loops to step 1004 to select the next alias media.

Figure 11:
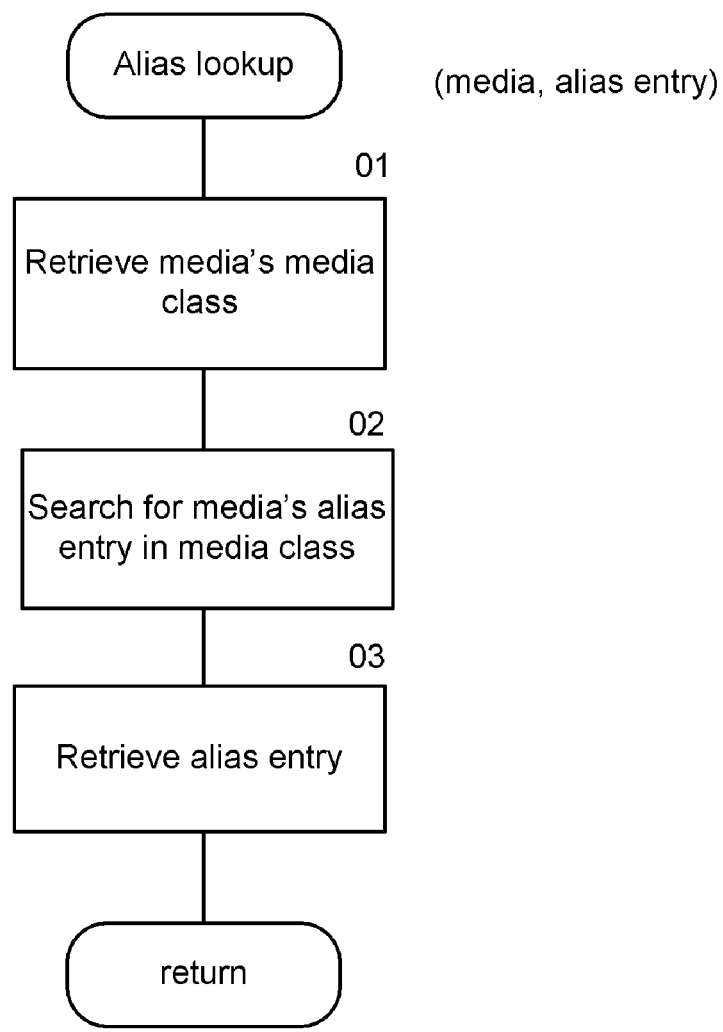
FIG. 11 is a flow diagram of an example implementation of an Alias_Lookup routine.

FIG. 11 is a flow diagram of an example implementation of an Alias_Lookup routine. This routine is passed a media and returns an alias entry for that media type from an alias table. The routine checks the alias table for the media class of the passed media. In step 1101, the routine retrieves the media class for the passed media. In step 1102, the routine searches for an alias entry in the alias table of the retrieved media class that matches the media type of passed media. In step 1103, the routine retrieves the found alias entry. The routine returns the retrieved alias entry.

Figure 12:
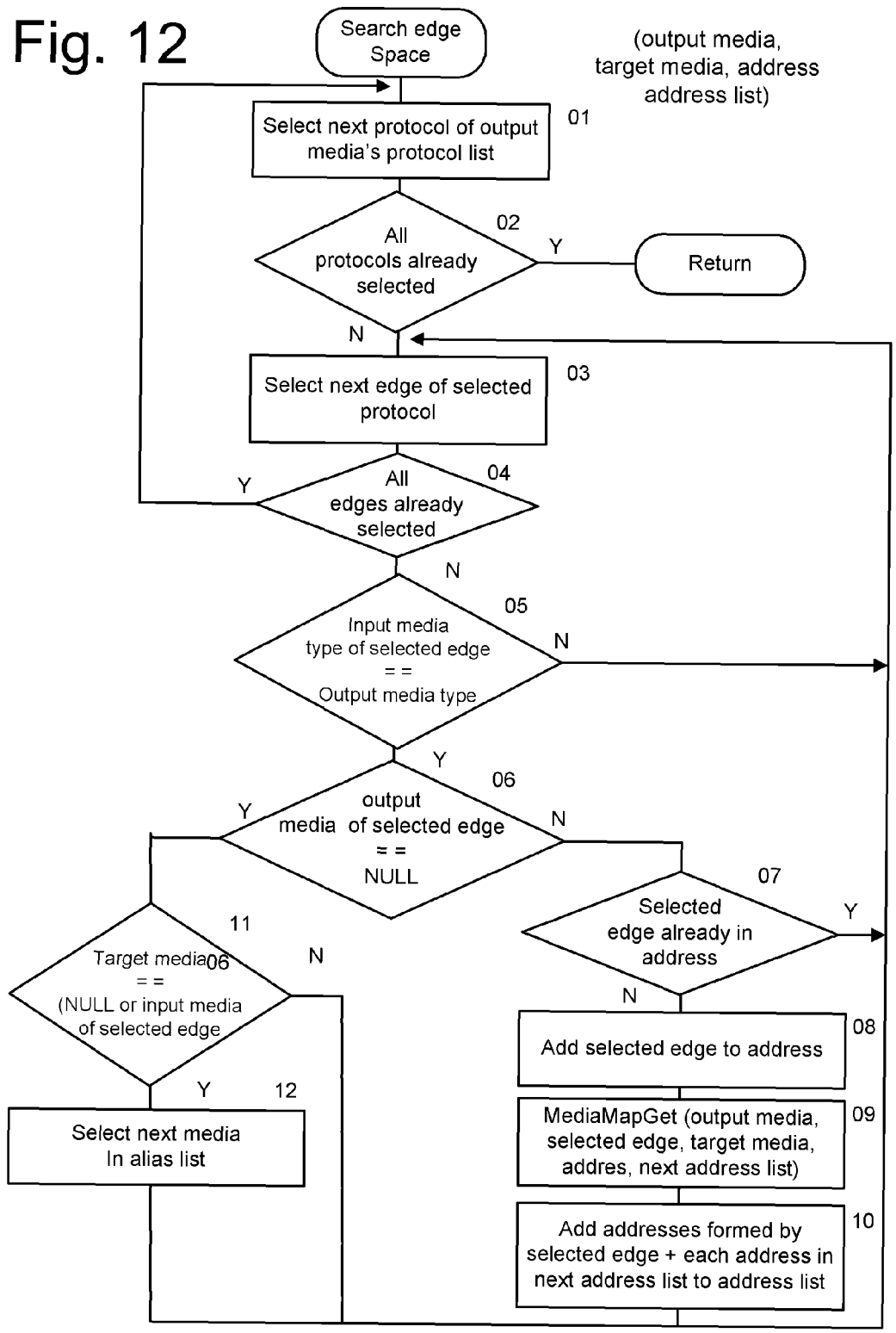
FIG. 12 is a flow diagram of an example implementation of a Search_Edge_Space routine.

FIG. 12 is a flow diagram of an example implementation of a Search_Edge_Space routine. This routine identifies paths from an output media type to a target media type and returns the addresses of those paths in the address list. If a protocol has an edge that inputs the output media type, then the routine recursively invokes the Media_Map_Get routine to find the addresses of a path from the output media type of that edge to the target media type. The routine then concatenates each of the returned addresses onto the edge to form an address of a path from the output media type to the target media type. If this routine encounters the end of a path, and the target media is a NULL or the target media type is the same as the input media type of the selected edge, then the edge is added to the address list. This routine checks each protocol in the protocol list for the passed output media to determine whether the protocol supports the output media type. In steps 1201-1210, the routine loops selecting each protocol in the protocol list of the media class of the output media and selecting each edge of each selected protocol. In step 1201, the routine selects the next protocol in the protocol list of the media class of the output media. In step 1202, if all the protocols have already been selected, then the routine returns, else the routine continues at step 1203. In step 1203, the routine selects the next edge of the selected protocol. In step 1204, if all the edges of the selected protocol have already been selected, then the routine loops to step 1201 to select the next protocol, else the routine continues at step 1205. In step 1205, if the input media type of the selected edge is equal to the passed output media type, then the path can be extended to include the selected edge and the routine continues at step 1206, else the routine loops to step 1203 to select the next edge of the selected protocol. In step 1206, if the output media type of the selected edge is null, then the end of a path has been reached and the routine continues that step 1209, else the routine continues that step 1207. An edge with an output media type of null is a sink edge that terminates a path. In step 1207, if the selected edge is already in the passed address, then the path for that address would have a loop so the routine loops to step 1203 to select the next edge in the selected protocol, else the routine continues at step 1208. In step 1208, the routine adds the selected edge to the passed address. In step 1209, the routine invokes the Media_Map_Get routine recursively. The routine passes the output media of the selected edge, the target media, the address, and a new address list. Upon return the next address list contains the addresses of paths from the output media type of the selected edge to the target media type. In step 1210, the routine adds to the passed address list addresses formed by concatenating each address of the next address list onto the selected edge and loops to select the next edge in the selected protocol. In step 1211, if the passed target media type is equal to null or is equal to the input media type of the selected edge, then the routine continues at step 1212, else the routine loops to step 1203 to select the next edge in the selected protocol. In step 1212, the routine adds the address of the selected edge to the passed address list and loops to step 1203 to select the next edge of the selected protocol.

Figure 13:
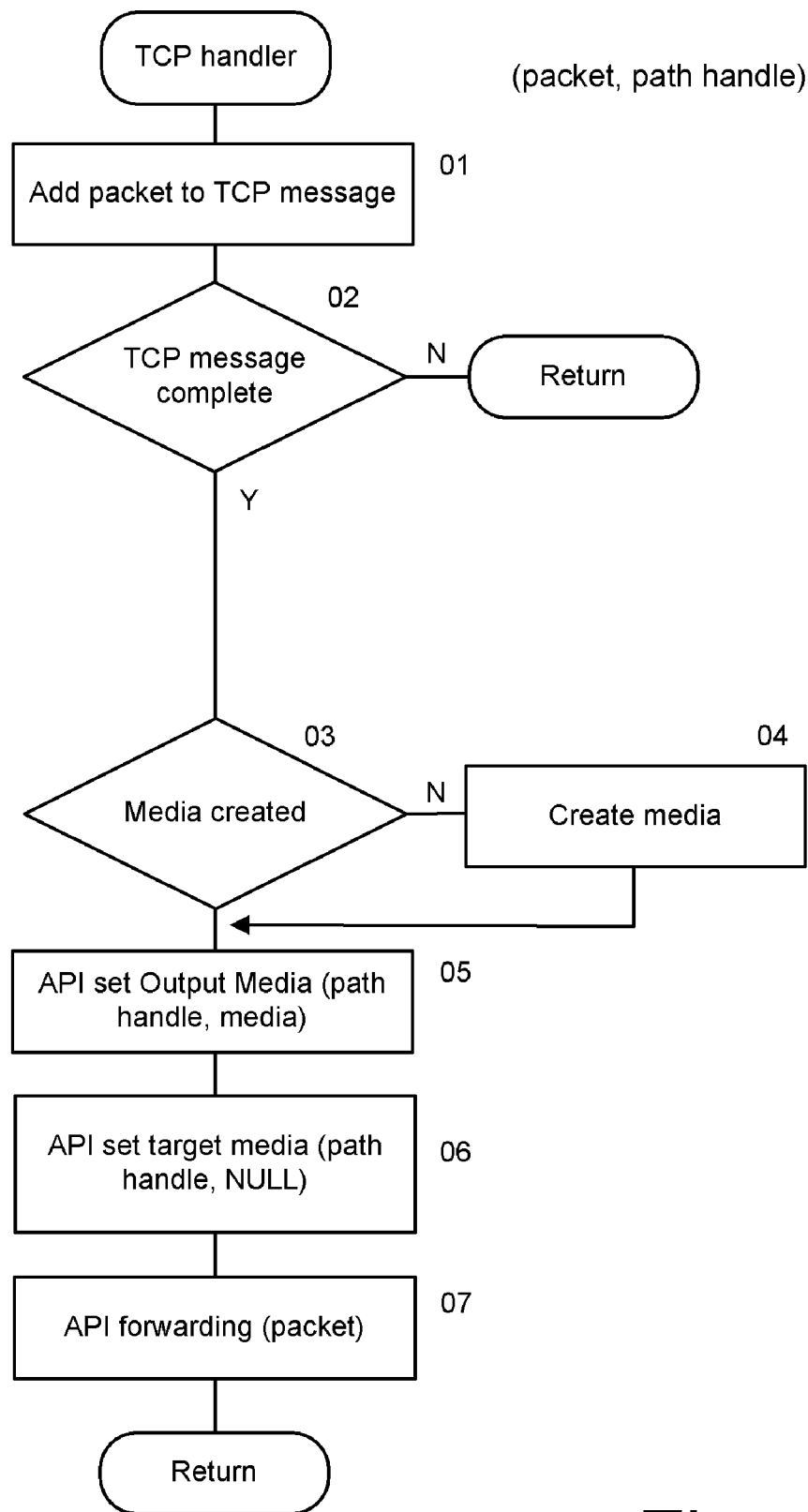
FIG. 13 is a flow diagram of an example handler for a protocol.

FIG. 13 is a flow diagram of an example handler for a protocol. This example handler inputs IP data packets and outputs TCP data packets. The handler is passed an IP packet and the handle to a path. This handler builds up a TCP packet from multiple IP packets. In step 1301, the handler adds the passed packet to the TCP packet that is being built up by the handler. Although not shown in the diagram, the handler detects whether the IP packet contains the start of a new TCP packet or continuing data for a TCP packet. The handler uses facilities of the media mapping system to store the TCP packet as it is being constructed. The handler does not store state information itself from one invocation to the next. Thus, when handler is invoked, it retrieves the state information for the TCP message from the media mapping system. In the step 1302, if the TCP packet is complete, then the handler continues at step 1302, else the handler returns. In step 1303, if an output media for the TCP packet for the media type of the packet already exists, then the handler reuses this output media and continues at step 1305. In step 1304, the handler creates a new output media for the media type of the TCP packet. In step 1305, the handler invokes an API of the media mapping system to associate the output media with the passed path handle. In step 1306, the handler optionally invokes an API of the media mapping system to specify a target media. In a step 1307, the handler invokes an API of the media mapping system passing the TCP packet to forward the TCP packet. The handler then returns.

Figure 14:
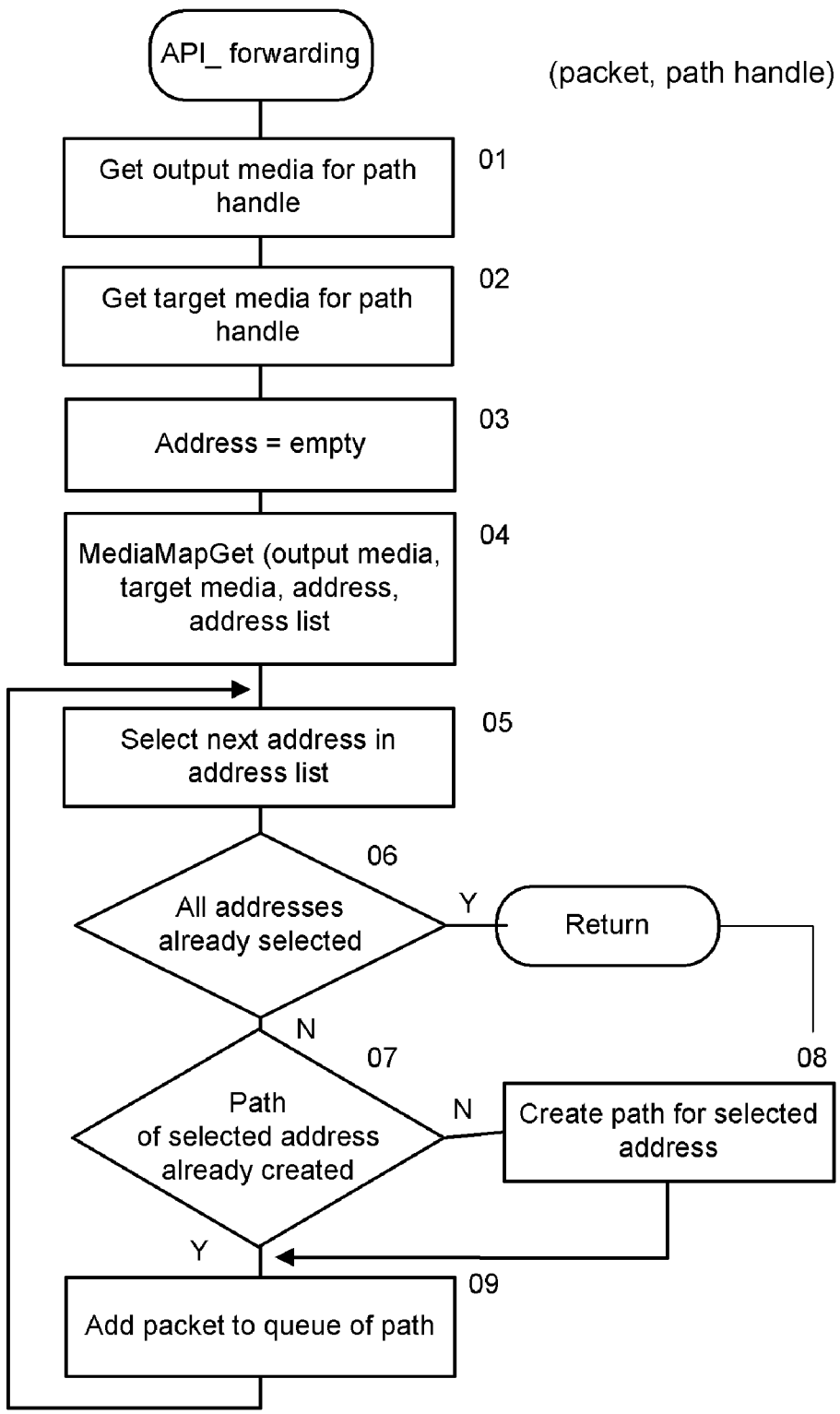
FIG. 14 is a flow diagram of an example implementation of the forwarding component.

FIG. 14 is a flow diagram of an example implementation of the forwarding component. This routine is passed a packet along with the handle of the path that is processing packet. This routine identifies paths that can process the packet, creates paths by creating threads for processing packets sent on each path, and adds the packet into a queue of each thread. In step 1401, the routine retrieves the output media for the path. In step 1402, the routine retrieves the target media for the path. In step 1403, routine sets the variable address to empty. In step 1404, the routine invokes the Media_Map_Get routine passing the output media, the target media, and the address. The routine receives an address list of addresses of paths from the output media type to the target media type. In steps 1405-1409, the routine loops creating paths for the addresses in the address list and adding the packet into a queue for each path. In step 1405, the routine selects the next address list. In step 1406, if all the addresses in the address list have already been selected, then the routine returns, else the routine continues at step 1407. In step 1407, if the path of the selected address has already been created, then the routine continues at step 1405, else the routine continues at step 1408. In step 1408, the routine creates a path for the selected address. In step 1409, the routine adds the packet to the queue for the path of the selected address and then loops to step 1405 to select the next address in the address list.

Figure 15:
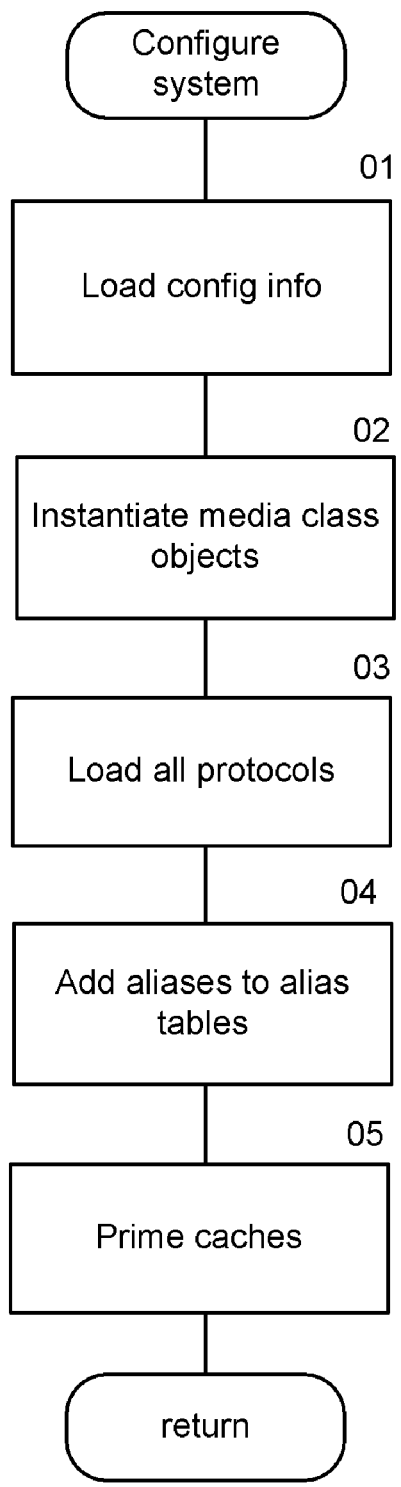
FIG. 15 is a flow diagram of a routine to configure the media mapping system.

FIG. 15 is a flow diagram of a routine to configure the media mapping system. This routine is invoked to initialize the media mapping system. The routine creates media classes, loads protocols, and initializes the alias tables. This information may also be modified dynamically after initialization. In particular, new media classes, aliases, and protocols can be added and removed. In step 1501, the routine loads configuration information from a persistent store, such as a disk drive. The configuration information contains a description of media classes, medias, media alias mappings, protocols, etc. In step 1502, the routine instantiates a media class object for each media class specified in the configuration information. In step 1503, the routine loads each protocol specified in the configuration information. Each protocol is stored in a dynamic link library. When the dynamic link library is loaded, an initialization routine for that protocol is invoked. That initialization routine adds the protocol to the protocol list of the appropriate media classes. In step 1504, for each pair of alias media types, the routine stores a pointer to the registered media object for the second media type in the pair in the alias table entry for the first media type in the pair. A registered media is created and added to the alias table as appropriate. In step 1505, the routine stores paths that are to be cached into the caches of the registered media. The routine then returns.

Figure 16:
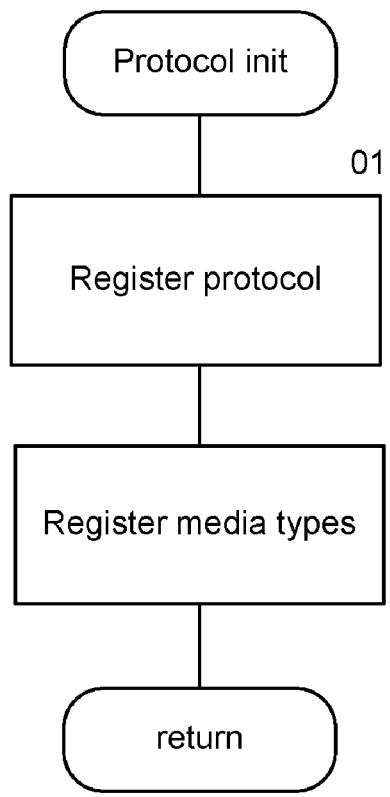
FIG. 16 is a flow diagram of an example implementation of a Protocol_Init routine.

FIG. 16 is a flow diagram of an example implementation of a Protocol_Init routine. In one embodiment, this routine is stored in a dynamic link library that contains the code for the protocol. When the dynamic link library is loaded, this routine is automatically invoked. This routine performs the registration and initialization of the protocol. In step 1601, the routine registers the protocol so that it can be included in paths. The routine registers a protocol by adding a reference to a protocol object to the protocol list of the media class of the input media type of each edge in the protocol. In step 1602, the routine registers any custom media types used by the protocol. The routine registers a custom media type by creating a media class for the custom media type if one does not yet exist. The routine then creates a registered media for the custom media type and adds it to the alias table of the media class. The routine may also add addresses of paths to the media cache of the registered media to prefill the cache with paths. The routine then returns.

Figure 17:
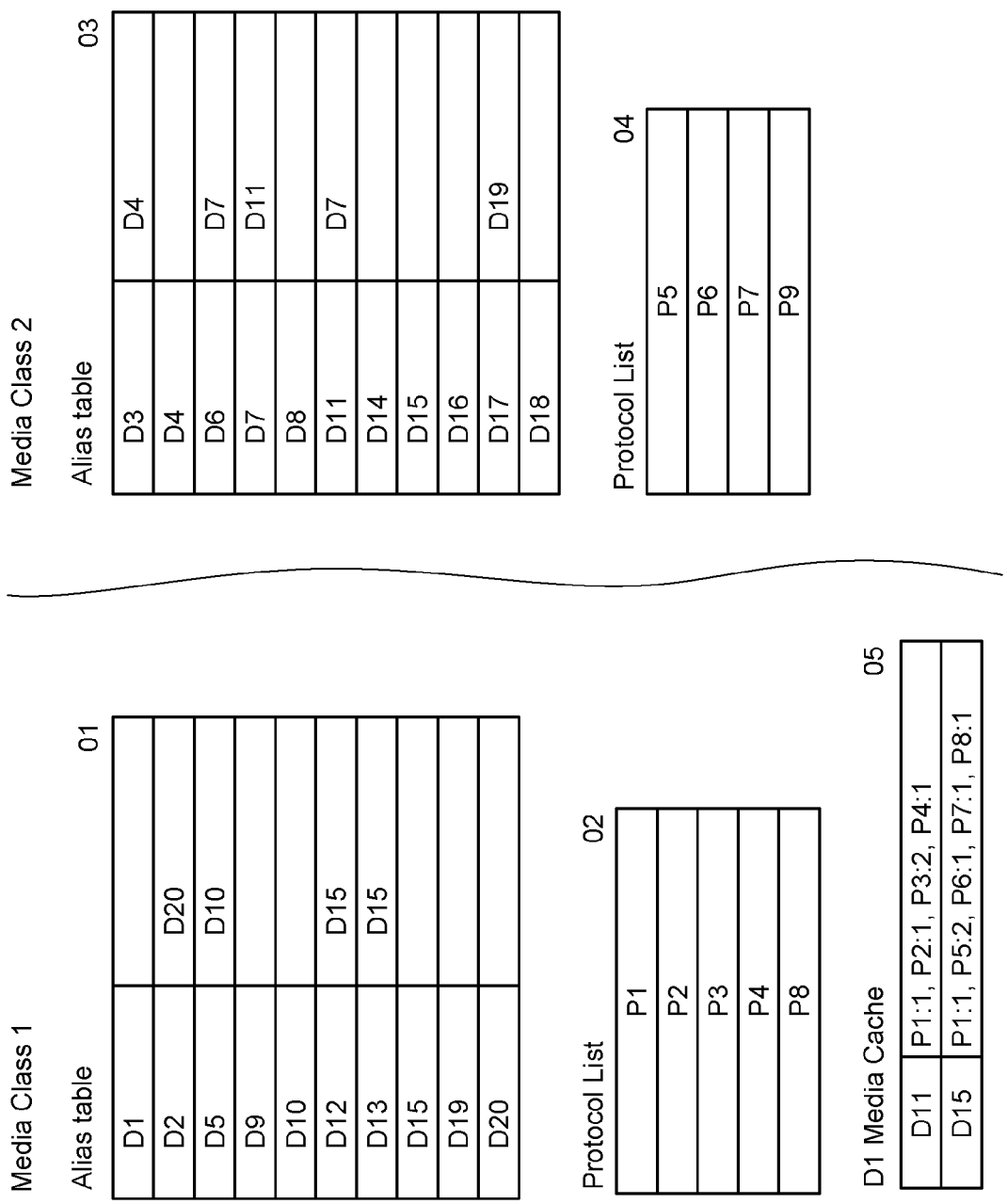
FIG. 17 is a diagram illustrating data structures of media classes.

FIG. 17 is a diagram illustrating data structures of media classes. Alias table 1701 contains registered medias for each media in the media class along with a mapping to the alias medias. For example, the registered media corresponding to media type D13 is stored in entry 1701*a*. The entry also indicates that media type D13 maps to media type D15. The protocol list 1702 indicates that five protocols have been registered for this media class, which means that each of these protocols have an edge that inputs a media type of this media class. The alias table 1703 and the protocol list 1704 contain information for a second media class. The media cache 1705 of media object D1 contains the addresses of paths that map media type D1 to media types D11 and D15.

Figure 18:
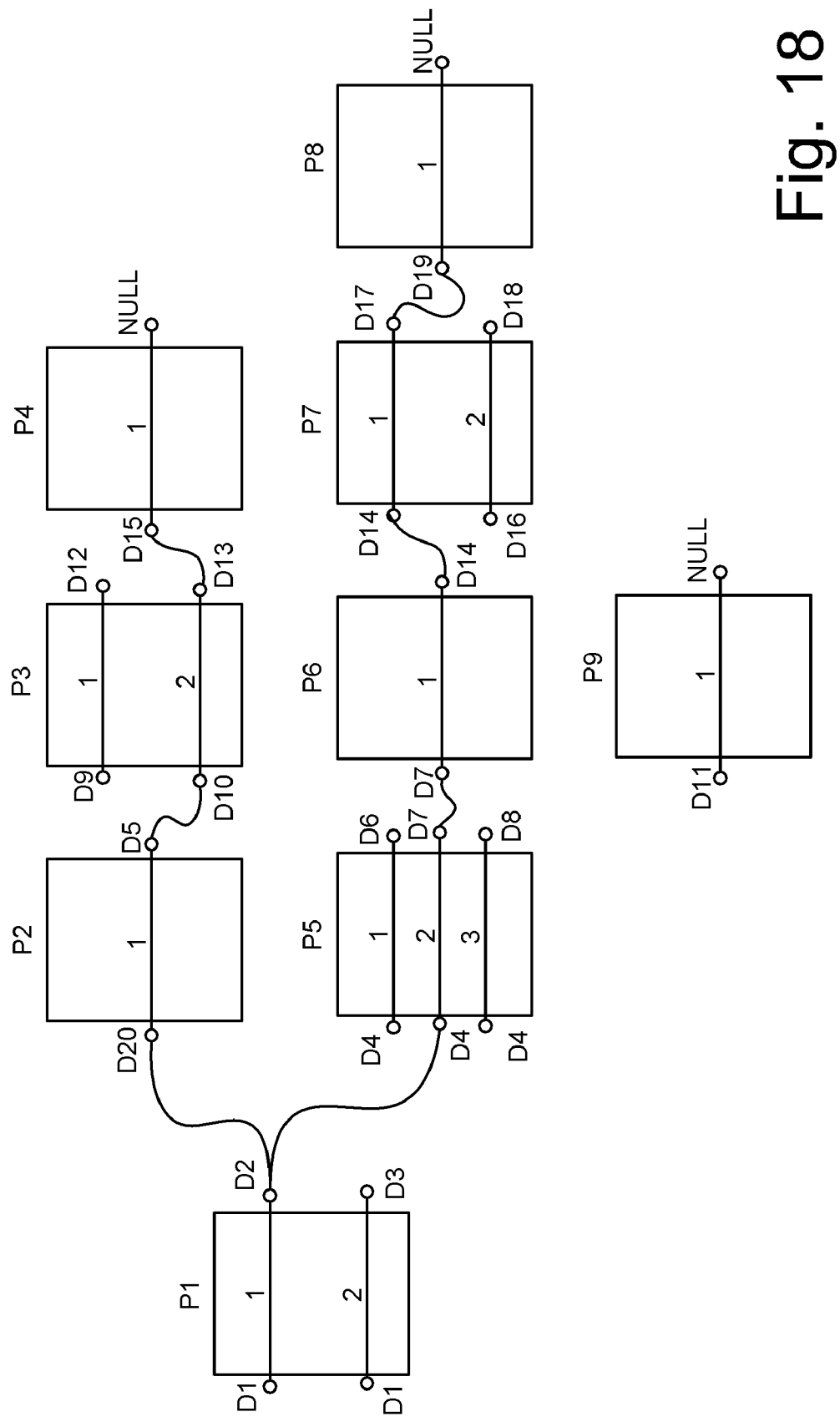
FIG. 18 is a diagram illustrating protocols and various paths through the protocols.

FIG. 18 is a diagram illustrating protocols and various paths through the protocols. The media mapping system identified two paths, which are indicated by the curved lines, to process media of data type D1. The paths have the addresses "P1:1,P2:1,P3:2,P4:1" and "P1:1,P5:2,P6:1,P7:1,P8:1." When identifying the paths, the media mapping system determined in that media type D20 is an alias for data type D2 as indicated by the second entry in the alias table 1701. The media mapping system also determined that media type D10 was an alias for media type D5, that media type D15 was an alias for media type D13, and that media type D19 was alias an for media type D17.

Figure 19:
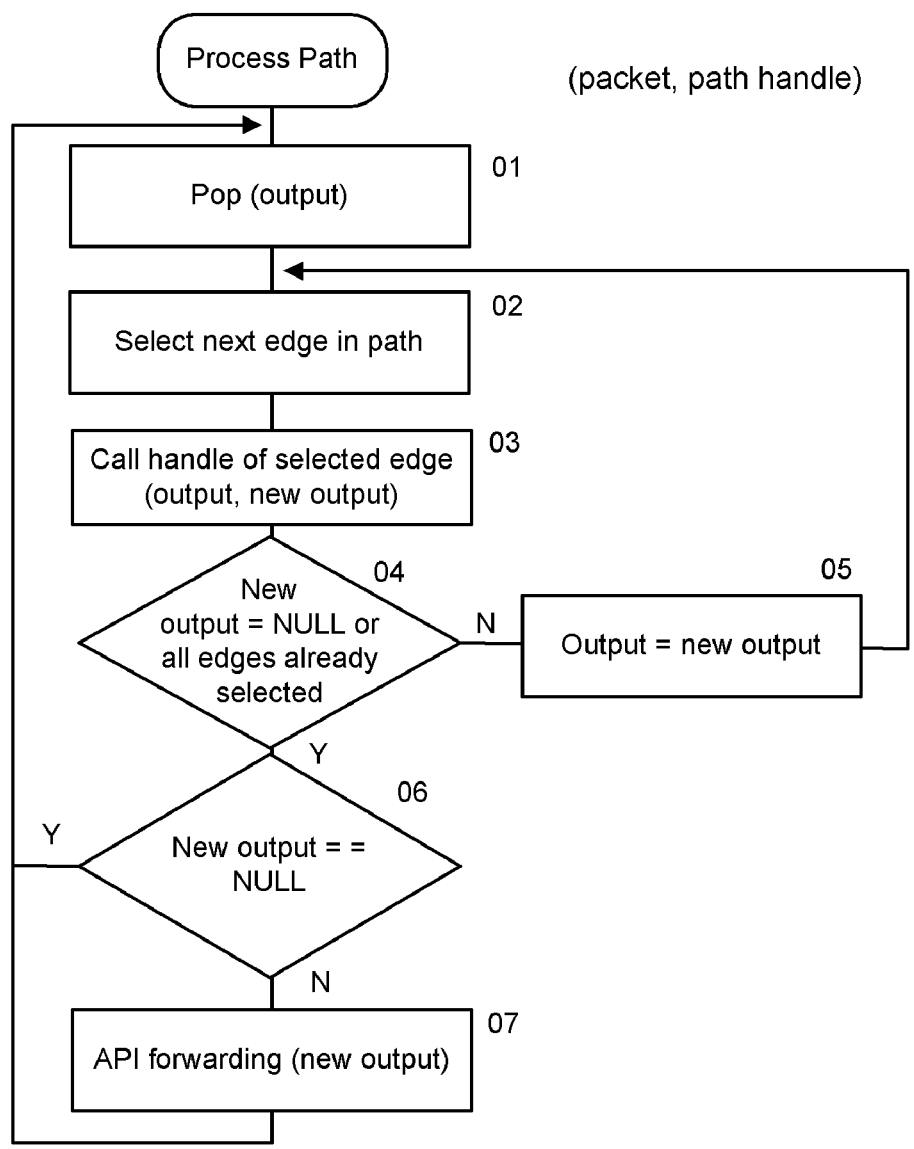
FIG. 19 is a flow diagram of an example implementation of a process path routine.

FIG. 19 is a flow diagram of an example implementation of a process path routine. The process path routine executes as a thread and retrieves data from the queue for the path and invokes the handlers associated with that path. Each path has its own thread that executes this routine. If at any point a handler returns no data, the process path routine stops processing that data last retrieved from the queue and checks the queue for the next data to be processed. If data is returned from the final handler in the path, then the process path routine forwards the data so that it may be further processed. In step 1901, the routine pops the queue for the path to retrieve the data from the queue. In steps 1902-1905, the routine loops selecting each edge in the path and invoking the handler of that edge. In step 1902, the routine selects the next edge in the path. In step 1903, the routine invokes the handler of the selected edge passing the output data and receiving new output data in return. In step 1904, if no new output data is returned or all the edges have already been selected, then the routine continues at step 1906, else the routine continues at step 1905. In step 1905, the routine sets the current output data to the new output data and loops to step 1902 to select the handler for the next edge in the path. In step 1906, if no new output data was returned, then the routine loops to step 1901 to process the next data in the queue, else the routine continues at step 1907. In step 1907, the routine invokes the API forwarding routine passing the new output data so that the output data can be further processed. The routine then loops to step 1901 to process the next data in the queue.

Figure 20:
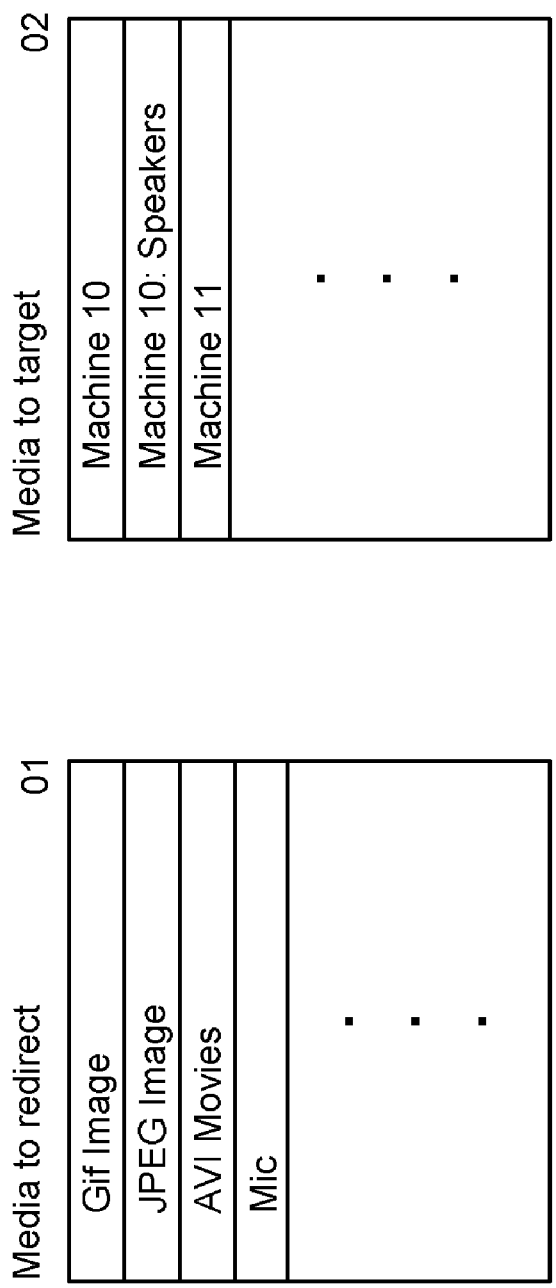
FIG. 20 is a block diagram illustrating the switchboard component of the media mapping system.

FIG. 20 is a block diagram illustrating the switchboard component of the media mapping system. Table 2001 illustrates a display of the current media types that are supported by the media mapping system. In this example, the media types supported are JIF, JPEG, AVI, and MIC. Table 2002 lists targets to which the data in the various media types can be routed. These targets include Machine 10, the speakers of Machine 10 and Machine 11. To designate that data of a certain media type is to be routed to a certain target, a user selects a media type (e.g., "MIC") and the selects the corresponding target (e.g., "Machine 10: Speakers"). The switchboard component may limit the displayed targets to only those that make sense for the selected data format. For example, it would make sense to route audio data to a speaker, but it may not make sense to route audio data to a display. To effect the routing of the data of a certain media type, the switchboard component stores the address of the path that effects that routing in the cache of the registered media for that media type. When data of that media type is next processed, the conversion system routes the data in accordance with the cached path.

Figure 21:
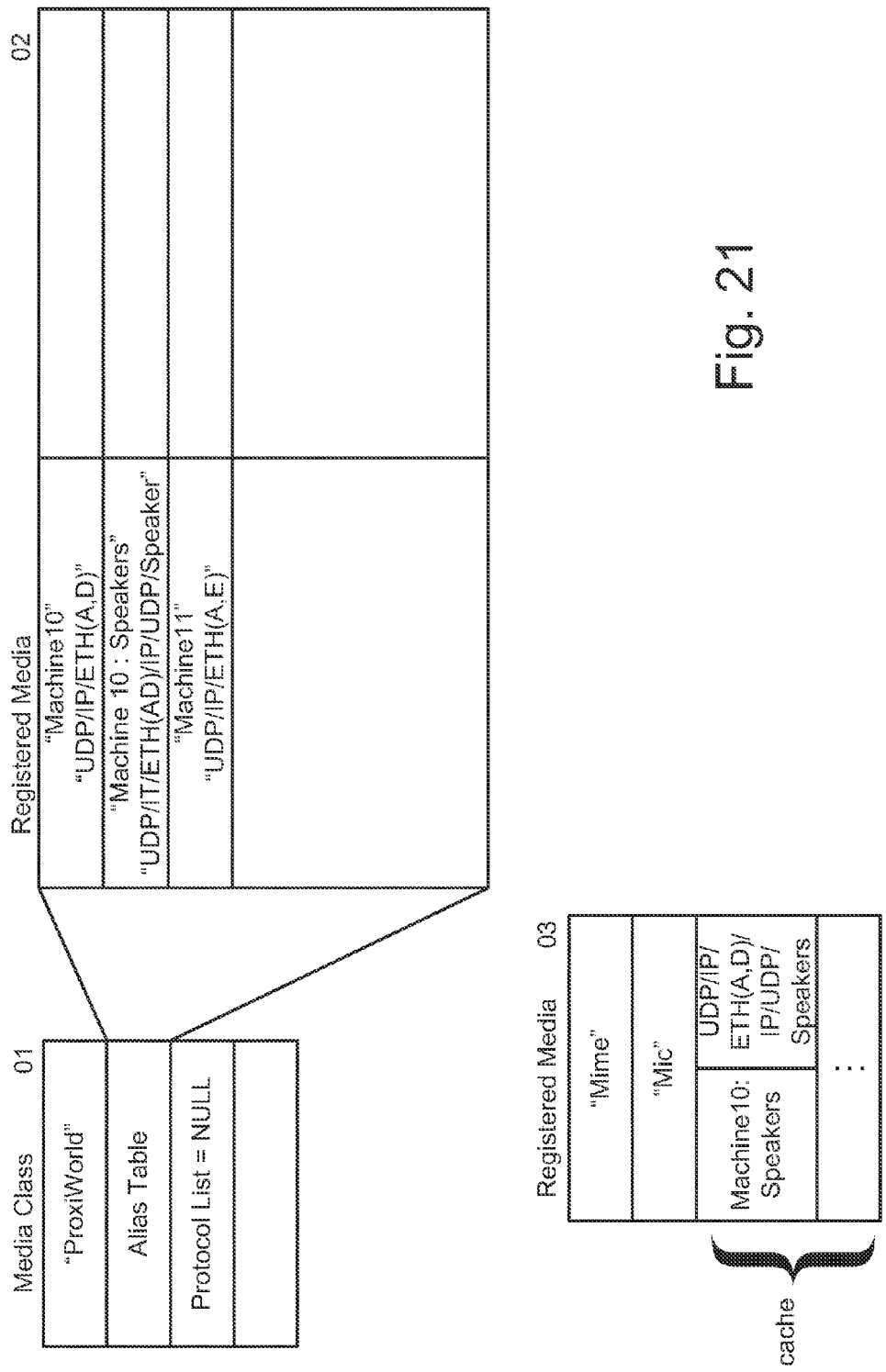
FIG. 21 is a block diagram illustrating the data structures to support the switchboard component.

FIG. 21 is a block diagram illustrating the data structures to support the switchboard component. The various targets for the switchboard components are stored as medias within a media class named "ProxiWorld." The ProxiWorld media class includes all the media types for the targets, along with cached data representing paths to those targets. Media class 2101 indicates that its name is ProxiWorld and that it has no protocols associated with it. The alias table 2102 for the ProxiWorld class contains an entry for each target. Each entry contains a registered media that identifies the name of the media type (e.g., "Machine 10") and identifies the address of a path to that target (e.g., "UDP/IP/ETH(A, D)"). The various media types of the ProxiWorld class can be specified based on initial configuration data or can be dynamically generated as computer systems and devices are connected to a network. For example, alias table 2102 indicates that Machine 10 and Machine 11 are currently connected to the current computer system. The media mapping system may monitor the network to detect when various targets may become available or become unavailable. The media mapping system may use a process target message routine to monitor the network and to update the entries in the ProxiWorld media class. When the process target message routine detects that a new target is available, it adds a new entry into the alias table 2101. When it detects that a new target is no longer available, it removes the corresponding entry from the alias table. The process target message routine may detect that a target is no longer available, by sending out periodic messages on the network. If no return message is received within a certain time period, then the process target message routine may assume that the target is no longer available. When the switchboard component is used to route a media type to a target, the switchboard component caches the path in the registered media for that media type. For example, registered media 2103 corresponds to the media type "MIC." The cache for that registered media contains an entry that identifies the speakers of Machine 10 along with a path to the target. When data of the MIC media type is to be processed, the media mapping system retrieves the path from this registered media and directs the data along that path.

In one embodiment, the media mapping system may derive the target from the data itself. For example, if the data is voice data intended for a telephone, then the handler processing the voice data may recognize the first words of the voice data as the name of the person to be called. The handler may retrieve that person's telephone number from an electronic telephone book and then may include that telephone number in the voice data so that a handler can dial the appropriate telephone number. Alternatively, the handler may retrieve a path for routing the voice data to that person that may be stored in a cache within the ProxiWorld media class.

As discussed above, the conversion system may cache paths locally within various media. If a certain path is cached locally in a media, then when a user uses the switchboard component to route data of that media type to another target, then the cache in that media will be out of date. In one embodiment, the conversion system may store in the cache of a media a pointer to the registered media for that media type. Thus, when the switchboard component is used to route data of that media type to a new target, the conversion system can use the pointer to retrieve the current path. Also, there may be situations when only parts of the path become out of date. For example, if the first two edges in a path are found by searching the edge space and the last part of the path is found in the ProxiWorld class, then a change in the ProxiWorld class would invalidate the end of the path that is cached. The conversion system may store various flags to indicate that cached data may be invalid. For example, the conversion system may maintain a time stamp for each media class that is updated whenever a cache in one of the registered media of that media class is updated. Each media may also have a time stamp when its cache was last updated. If the time stamp in the media class is later than the time stamp in a media, then the cache in the media may be out of data. Alternatively, a time stamp may also be stored in each registered media, rather than having just one time stamp for a media class.

Figure 22:
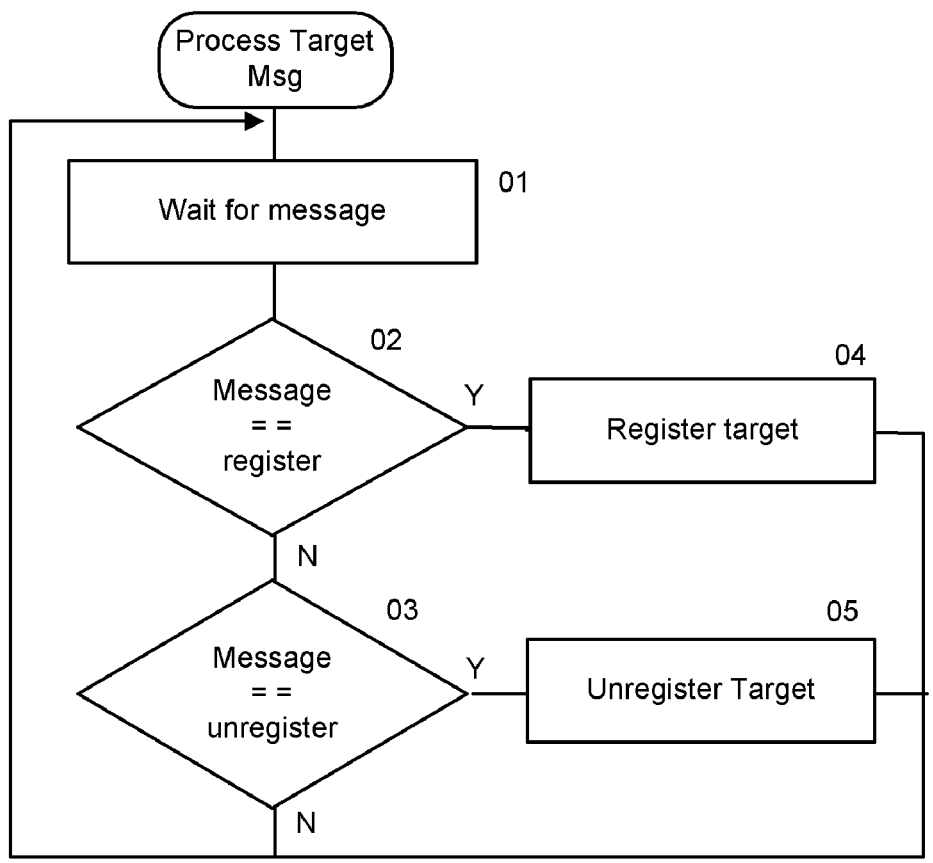
FIG. 22 is a flow diagram of an example implementation of a processed target message routine.

FIG. 22 is a flow diagram of an example implementation of a processed target message routine. This routine loops monitoring the network to determine whether targets should be registered or unregistered. The routine adjusts the alias table for the ProxiWorld media class as a appropriate. In step 2201, the routine waits for a message to be send on the network. In step 2201, if a message indicates to register a target, then the routine continues at step 2203, else the routine continues at step 2204. In step 2203, the routine invokes a register target routine and then loops to step 2201 to wait for the next message. In step 2204, if the message is to unregister a target, then the routine continues at step 2205, else the routine loops to step 2202 to wait for the next message. In step 2205, the routine invokes an unregister target routine and then loops to step 2201 to wait for the next message.

Figure 23:
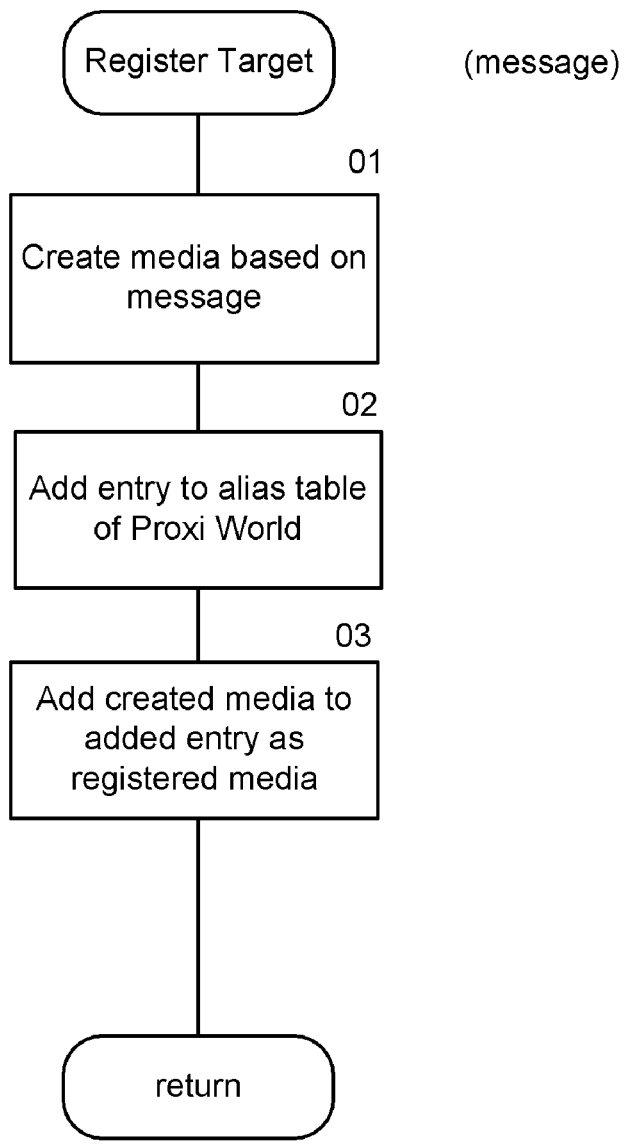
FIG. 23 is a flow diagram of an example implementation of the register target routine.

FIG. 23 is a flow diagram of an example implementation of the register target routine. This routine is passed a message that indicates a class name of the target and a path to the target. In step 2301, the routine creates a media based on the passed message. In step 2302, the routine adds an entry to the alias table of the ProxiWorld media class. In step 2303, the routine adds the created media to the added entry as a registered media for that media type. The routine then returns.

Figure 24:
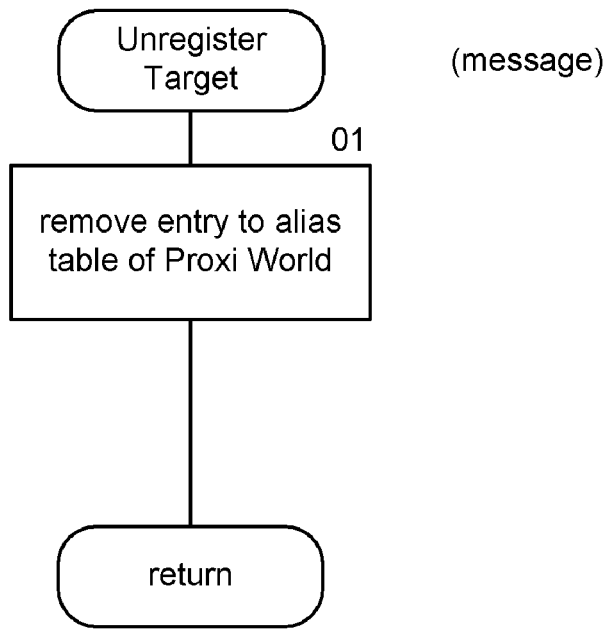
FIG. 24 is a flow diagram of an example implementation of an unregistered target routine.

FIG. 24 is a flow diagram of an example implementation of an unregister target routine. This routine is passed a message that indicates a media type of the target. In step 2401, the routine removes an entry from the alias table for the ProxiWorld corresponding to the passed media type. The routine then returns.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method in a computer system for identifying a sequence of routines for processing data, the computer system having a plurality of routines, each routine for inputting data of an input type and outputting data of an output type, the method comprising:
   providing pairs of alias types, each pair having an output type and input type wherein data of the output type can be processed by a routine for inputting data with the input type;
   receiving data of a source type that is to be converted to a destination type;
   identifying a sequence of routines such that a first routine in the sequence inputs data of the source type or of an alias type of the source type as indicated by the provided pairs of alias types, such that a last routine in the sequence outputs data of the destination type, and such that each intermediate routine in the sequence inputs data of the output type of the previous routine in the sequence or data of an alias type of the output type of the previous routine in the sequence as indicated by the provide pairs of alias types.

2. The method of claim 1 wherein the identifying of the sequence of routines includes determining whether the sequence of routines for converting data of the source data type to the destination data type has already been identified and using the identified sequence.

3. The method of claim 1 including storing an indication of the identified sequence of routines in a cache.

4. The method of claim 3 wherein the identifying includes retrieving from the cache the indication of the identified sequence.

5. A method in a computer system for routing data of an output type to a target, the method comprising:
   providing an identifier of a path for routing data of the output type to the target;
   providing an indication to route data of the output type to the target;
   receiving data of the output type;
   using the output type of the received data to retrieve the provided indication to route data of that output type to the target;
   using the target of the retrieved indication to retrieving the provided path identifier for that target; and
   routing data in accordance with the retrieved path.

6. The method of claim 5 wherein the providing an identifier of a path includes receiving the identifier of the path from another computer system.

7. The method of claim 5 wherein the providing of the indication to route data of the output type to the target includes analyzing the received data to identify the target.

8. The method of claim 7 wherein the data is voice data and the analyzing includes identifying an intended recipient of the voice data.

9. The method of claim 5 wherein the providing of the indication to route data of the output type to the target includes receiving a selection of the output type and the target from a user.

10. The method of claim 5 wherein the providing of the indication to route data of the output type to the target includes displaying a list of output types and a list of possible targets to a user.

11. A method in a computer system for determining a sequence of routines for converting data of a source type to a target type, the method comprising:

providing a plurality of routines, each routine having an input type and an output type; and identifying one or more routines of the sequence such that the output type of each routine in the sequence is compatible with the input type of the next routine in the sequence and wherein the input type of the first routine in the sequence is compatible with the source type and wherein the output type of the last routine in the sequence is compatible with the target type.

12. The method of claim 11 including caching an indication of the identified routines and when subsequently determining a sequence, checking the cache.

13. The method of claim 12 including priming the cache with an indication of a sequence of routines so that the identifying can be bypassed.

14. A computer system for processing data, comprising:

a set of routines for processing data in an input type into an output type;

a searching component that receives an indication of a source type and that identifies a sequence of routines for processing the data into a target type;

a routing component that receives identifications of sequences of routines for routing data in a source type to a target; and a processing component that receives an indication of a source type and selects an identified sequence of routine for processing data of the source type.

15. The computer system of claim 14 wherein multiple sequences are selected for a source type.

16. The computer system of claim 14 wherein the routing component includes a receiving target component that receives the identifications of sequences.

17. The computer system of claim 14 wherein the routing component includes a user interface for specifying that data of a certain source type is to be routed to a target.

18. The computer system of claim 17 wherein the target is a routine.

* * * * *